US007173783B1

(12) United States Patent
McEwen et al.

(10) Patent No.: US 7,173,783 B1
(45) Date of Patent: Feb. 6, 2007

(54) MEDIA NOISE OPTIMIZED DETECTOR FOR MAGNETIC RECORDING

(75) Inventors: Peter McEwen, deceased, late of Porter, TX (US); by John McEwen, legal representative, Porter, TX (US); Bahjat Zafer, Sunnyvale, CA (US); Pauline Bolte, San Jose, CA (US); Ara Patapoutian, Westborough, MA (US); Kelly Fitzpatrick, Sudbury, MA (US); Steve Stupp, Los Altos, CA (US)

(73) Assignee: Maxtor Corporation, Longmont, CO (US)

( * ) Notice: Subject to any disclaimer, the term of this patent is extended or adjusted under 35 U.S.C. 154(b) by 68 days.

(21) Appl. No.: 10/247,929

(22) Filed: Sep. 20, 2002

Related U.S. Application Data

(60) Provisional application No. 60/323,960, filed on Sep. 21, 2001.

(51) Int. Cl.
  *G11B 5/09* (2006.01)
  *G11B 27/36* (2006.01)
  *H03D 1/00* (2006.01)
  *H04L 27/06* (2006.01)
  *H03M 13/03* (2006.01)

(52) U.S. Cl. .................... 360/46; 369/59.22; 375/341; 714/796

(58) Field of Classification Search .................... None
  See application file for complete search history.

(56) References Cited

U.S. PATENT DOCUMENTS 4,631,604 A * 12/1986 Randall .................. 360/66
6,201,839 B1   3/2001 Kavcic et al. ............ 375/341
6,249,398 B1   6/2001 Fisher et al. ............. 360/65
6,724,550 B2 * 4/2004 Teo et al. ................. 360/25
6,728,928 B2 * 4/2004 Jeon et al. ................ 714/795

OTHER PUBLICATIONS

A. Kavcic and J.M.F. Moura, "The Viterbi Algorithm and Markov Noise Memory," IEEE Trans. Inform. Theory, vol. 46, pp. 291-301, Jan. 2000.

Zeng et al.; "Modified Viterbi Algorithm for Jitter-Dominant 1-D² Channel;" IEEE Trans. On Magnetics; vol. 28; No. 5; Sep. 1992; pp. 2895-2897.

* cited by examiner

*Primary Examiner*—David Hudspeth
*Assistant Examiner*—Daniell L. Negron
(74) *Attorney, Agent, or Firm*—Tejpal S. Hansra

(57) ABSTRACT

A media noise optimized (MNO) detector for a read channel compensates for pattern dependent media noise, and compensates for nonlinearities from many sources such as residual MR nonlinearity, residual nonlinear transition shift, partial erasure, write-induced nonlinearity, and steady-state mis-equalization. The MNO detector is implemented by adjusting a conventional Viterbi detector branch metric so that the channel output value (ideal value) can be a nonlinear function of the state/branch bits, and the branch metric scaling factor is a function of the state/branch. For a given state/branch, the ideal value is the mean of analog-to-digital converter samples for the pattern corresponding to the state/branch, and the branch metric scaling factor is proportional to the noise variance for the pattern corresponding to that state/branch.

100 Claims, 4 Drawing Sheets

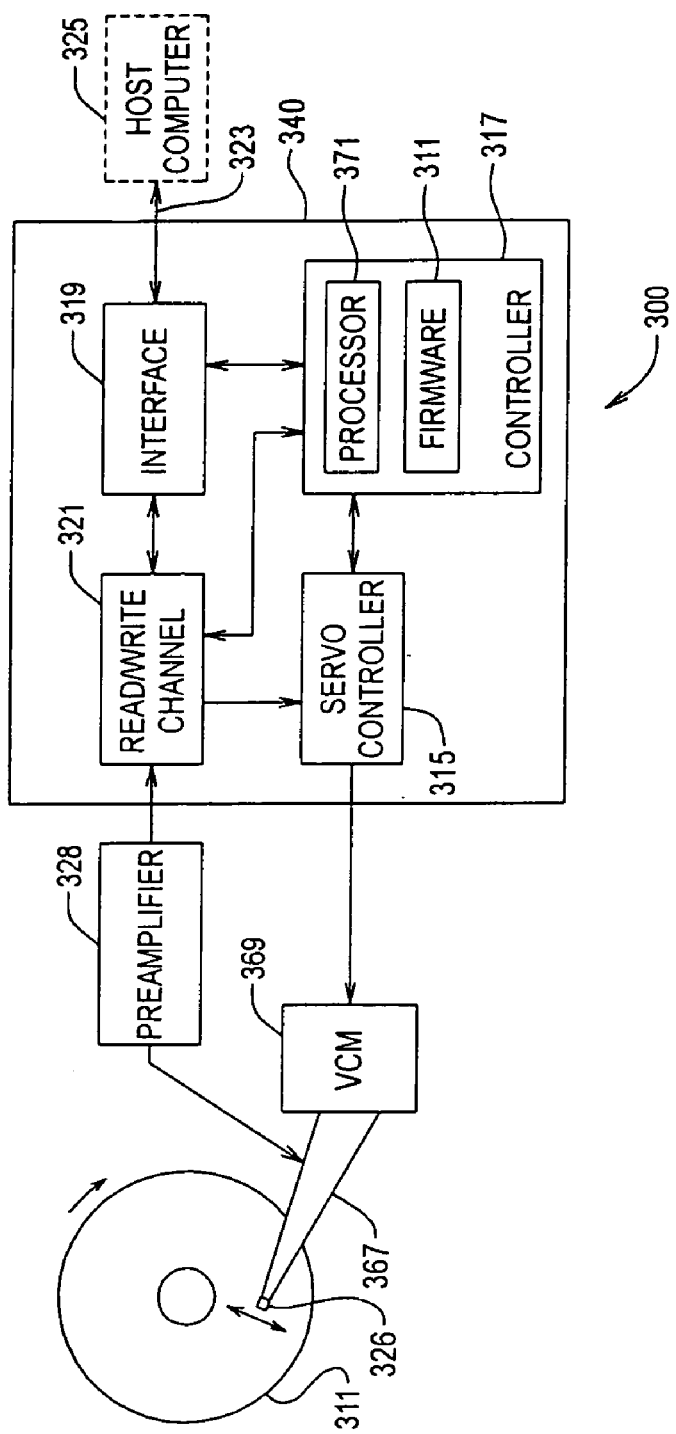

MEDIA NOISE OPTIMIZED DETECTOR FOR MAGNETIC RECORDING

RELATED APPLICATION

This application claims priority from U.S. Provisional Application No. 60/323,960, entitled "A Media Noise Optimized Detector for Magnetic Recording", filed on Sep. 21, 2001, which is incorporated herein by reference.

FIELD OF THE INVENTION

The present invention is in the field of digital data storage technology and, more specifically, pertains to improvements in partial response, maximum likelihood detection systems of the type commonly used in read channels of magnetic recording systems, particularly disk drives and tape systems.

BACKGROUND OF THE INVENTION

Disk drives are well known in the computer art for providing secondary mass storage with random access. A disk drive essentially comprises one or more magnetic data storage disks rotating on a spindle by a spindle motor within an enclosed housing. A magnetic transducer head is placed on an actuator arm and positioned very closely to each data storage surface by a slider suspended upon an air bearing. Servo information is typically written in servo sectors which interrupt data sectors or blocks on each disk. Servo information provides a servo control loop in the disk drive with head position information to enable a head positioner mechanism, such as a rotary voice coil motor (VCM), to move the actuator arm, and therefore the head, from track to track during random access track seeking operations, and to maintain the head in proper alignment with a track centerline during track following operations when user data is written to or read from the available data block storage areas of the disk surface.

Efforts have been made to increase the data storage capacity of disk drives. In one example, the bit density on the disk magnetic media has been increased to pack the data more tightly on a given track. When this method is implemented, writing data is still relatively simple using standard inductive head technology. Reading the data back, however, becomes more challenging as spacing between flux transitions on the media is reduced. To ensure accurate data reads, several methods are used. It is known to use two separate heads; one for reading and one for writing. Standard inductive heads are used for writing, and ultra-sensitive magneto-resistive (MR) heads are used for reading. The read heads generate analog signals in response to flux transitions on the media, and the "read signal" (e.g., a readback signal) is interpreted or "detected" by the drive electronics (e.g., a detector).

Sampled data detectors implementing partial response signaling are in use in conventional disk drives. In sampled data detection systems, the readback signal is filtered and sampled at a channel rate of 1/T, where T is the duration of a channel symbol. One such technique employs what is known as a partial response maximum likelihood (PRML) system. The synchronous sampling process employed in PRML quantizes signal amplitudes at specific intervals throughout each readback signal transition interval T. One widespread PRML system uses filters to equalize the readback signal to a partial response class 4 (PR4) signal. The discrete-time transfer function of a PR4 channel is $(1-D)^2$, where D represents a unit-time delay operator with unit-time T. In an idealized PR4 channel, a noiseless output is equal to the input signal minus a version of the input signal delayed in time by 2T. In a practical PR4 channel, the output of the noisy partial response channel is sampled at the channel rate and detected using a sequence detector, such as a Viterbi detector. Another partial response model is EPR4 with a discrete-time transfer function of $(1-D)(1+D)^2$ or $(1+D-D^2-D^3)$ and EEPR4 with a discrete-time transfer function of $(1-D)(1+D)^3$ or $(1+2D-2D^3-D^4)$.

Once a channel model is selected, a sequence detector may be fashioned. Sequence detectors frequently implement a version of the Viterbi algorithm. Typically, the Viterbi detector is designed for maximum likelihood detection of the sampled partial response channel in additive, independent, and identically distributed Gaussian noise with zero mean. The Viterbi algorithm minimizes squared Euclidean distance between the sequence of noisy samples and all possible sequences of idealized noiseless samples in accordance with the particular channel model. The Viterbi algorithm is an iterative process of keeping track of the path (branch) with the smallest accumulated metric (branch metric) leading to each state. The metrics of all of the paths leading into a particular state are calculated and compared. Then, the path with the smallest metric is selected as a survivor path and the other paths are discarded. In this manner, all paths which are not part of the minimum metric path are systematically eliminated. The survivor path to each state is stored in a path memory. Given that the path memory is made sufficiently long, nearly all of the selected survivor paths will almost always diverge from a single path within the span of the path memory. The single path from which all the current survivor paths diverge is the minimum metric path. The Viterbi detector then traces back along the path memory to find the convergence state. The input sequence associated with the single minimum metric path then becomes the most-likely symbol output of the Viterbi detector.

A Viterbi detector does not attempt to decide whether a transition has occurred upon receipt of a readback sample or samples taken from a particular transition. Rather, samples are taken from the readback signal and equalized to the target channel model. The Viterbi detector then keeps a running tally of the error between the actual sample sequence and a correct sample sequence, i.e. a sequence that would be expected if the recording media had been written with a particular sequence of transitions. One way of visualizing the Viterbi detector path memory is by way of a trellis diagram having plural states and plural paths leading from each state to other states. As analog-to-digital samples (y) are fed into one end of the trellis, estimates of previous bits are output at an opposite end of the trellis. An error metric is determined for each one of plural possible state transition sequences. As more samples come into the Viterbi detector, less probable transition sequences (branches/paths) are eliminated and, by tracing back along the trellis, a most likely path emerges as a convergent set of paths which enables a most-likely data decision to be made by the Viterbi detector.

The magnetic recording channel is not an ideal channel. Rather, noise, media defects, non-linear response of the playback element and other distracting influences may result in distortion of, or error in, the readback signal. Therefore, error events can, and do, occur. When sequence detection is employed, error events may result in a most likely path being selected by the Viterbi detector which diverges from the correct path. Coding constraints are frequently employed in order to limit burst error lengths so that the trellis (path memory) can be made with a practical maximum number of states. However, in any sequence detector, such as a Viterbi detector, the trellis will have multiple states and must receive multiple samples before it can reach its decision as to each most likely path (and therefore each most likely binary data value (one or zero) to output).

A significant trend currently occurring in the magnetic disk drive industry is that there is more pattern dependent media noise (primarily because of larger magnetic grains due to thermal instability concerns) and more nonlinearity (primarily because of higher data rate). In current read channels, detection algorithms in detectors assume a linear magnetic recording channel (after write precompensation and MR non-linearity cancellation) with additive (not pattern dependent) Gaussian noise. Thus, the performance of conventional detectors is significantly degraded because they do not take into account media noise and nonlinearities. For example, currently available read channels that use Viterbi detectors do not take into account pattern dependent media noise or pattern dependent nonlinearities. This includes detectors which are referred to as noise-whitening detectors.

U.S. Pat. No. 6,201,839 to Kavcic et al. ('839 patent) and a corresponding publication titled "The Viterbi Algorithm and Markov Noise Memory" (A. Kavcic and J. M. F. Moura, IEEE Trans. on Information Theory, vol. 46, no. 1, pp. 291–301 (January, 2000)) provide a theoretical basis for detectors for signal dependent nonlinearity and signal dependent colored noise. The '839 patent generally suggests various detector structures for signal dependent nonlinearity and signal dependent colored noise under certain assumptions, but does not provide a particular structure for magnetic recording. Further, most of the detector structures described are very complex, and thus very difficult to implement in a read channel. Even further, the problem of training/optimization of the detector, or any of the other associated algorithms for magnetic recording, is not addressed. Yet further, in another publication titled "Modified Viterbi Algorithm for Jitter-Dominant 1–$D^2$ channel" by Zeng et al., IEEE Trans. on Magnetics, vol. 28, no. 5, pp. 2895–2897 (September, 1992), the publication discusses the branch metric scaling for only a PR4 channel and does not offer an approach to compensate for signal nonlinearities.

BRIEF SUMMARY OF THE INVENTION

The present invention addresses the above problems. In one embodiment, branch metric scaling for nonlinearities and data-dependent noise is performed. The scaling can be applied to all partial response targets and is not limited to PR4. In another embodiment, the present invention provides algorithms and circuits to obtain the nonlinearities as well as the signal-dependent noise variances, and implements such algorithms in both hardware and firmware. Further, several practical methods are provided to calculate and adapt the nonlinearity parameters "on the fly" and, in the case of a retry, in actual disk drive operations. Even further, a method is provided to measure the parameters without the need for a Viterbi detector by writing a known pattern to the drive and bypassing the Viterbi detector (or any other detector). This has the advantage of eliminating the effect of detector errors as well as other imperfections such as thermal asperities (TA) and defects on the calculated parameters.

In one embodiment, the present invention provides a media noise optimized (MNO) detector for a read channel that compensates for pattern dependent media noise, and compensates for nonlinearities from many sources such as residual MR nonlinearity, residual nonlinear transition shift (NLTS), partial erasure, write-induced nonlinearity, and steady-state mis-equalization.

In one embodiment, the MNO detector is implemented by adjusting the conventional Viterbi detector branch metric so that the channel output value (ideal value) can be a nonlinear function of the state/branch bits, and the branch metric scaling factor is a function of the state/branch. For a given state/branch, the ideal value is the mean of the analog-to-digital converter (ADC) samples for the pattern corresponding to the state/branch, and the branch metric scaling factor is proportional to the noise variance for the pattern corresponding to that state/branch.

Further, thermal decay can be detected by retraining ideal value and scaling factor parameters and testing for a reduction in magnitude of the ideal value for certain patterns corresponding to closely-spaced transitions. The MNO detector can also be retrained to compensate for external DC magnetic fields in perpendicular recording, and to provide sequence amplitude margin capability which could be used in channel optimization.

The performance gain from the MNO detector is higher with marginal or poor head/media, which can provide a significant disk drive yield benefit, resulting in cost savings. The performance gain can also be used to achieve higher areal density and/or better reliability.

BRIEF DESCRIPTION OF THE DRAWINGS

These and other features, aspects and advantages of the present invention will become understood with reference to the following description, appended claims and accompanying figures where:

FIG. 5 shows an example block diagram of a disk drive embodying aspects of the present invention.

Like reference numbers refer to like elements.

DETAILED DESCRIPTION OF THE INVENTION

Figure 1:
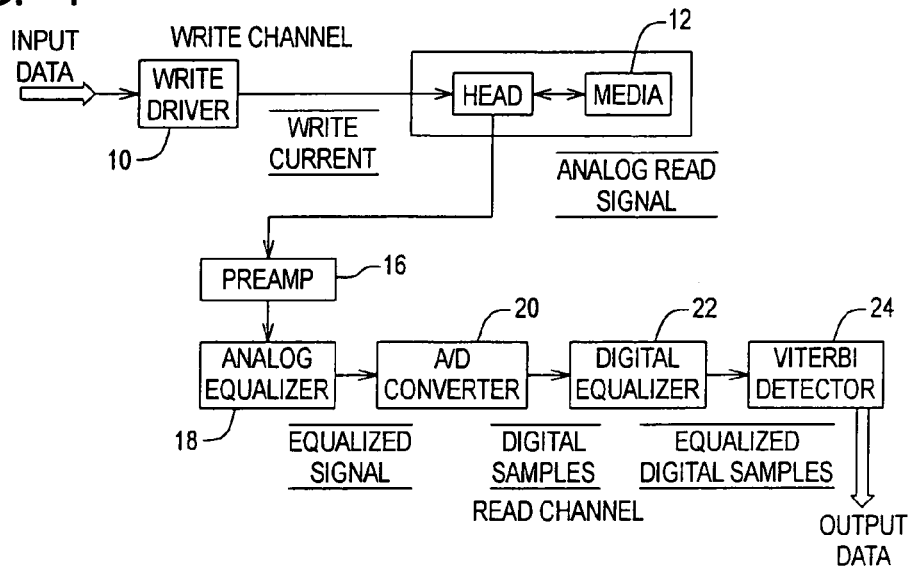
FIG. 1 is a simplified example diagram of an embodiment of read channel electronics in a data disk drive.

FIG. 1 is a simplified block diagram illustrating the principal building blocks of a magnetic recording and read channel used in a disk drive. In the example PRML channel, user data is encoded using a run length limited (RLL) code, such as RLL (1,7) or RLL (0,4/4), the latter providing a ratio of user data to stored data of about 8/9. The encoded series of bits are input to write driver 10 which controls a write current applied to a write head carried on a slider over a rotating magnetic disk media 12. The write driver 10, in combination with the write head, records the data as a series of magnetic flux transitions on a selected track on the media 12. For example, a "1" is represented as a transition and a "0" as no transition.

During a read operation, the read head provides an analog read signal responsive to the flux transitions as the data track moves past the head. The analog read signal is input to a preamp 16 and then to an analog equalizer 18. The analog equalizer 18 provides a preliminary analog equalization of the read signal. The equalized read signal is then sampled and the samples are converted to digital values in a high-speed A/D converter (ADC) 20. In general, the read channel amplifies and filters the read signal to remove noise and to shape the waveform—a process known as digital equalization. First, the read signal is normalized with respect to gain and offset so that it falls into an expected signal range centered at zero. With gain and offset normalization, the required dynamic range of subsequent circuits can be limited, which reduces power consumption and increases possible clock frequencies and data rates. Next, unwanted high-frequency noise is removed with a continuous time low-pass filter. This step permits sampling of the signal without aliasing of high-frequency noise back into the signal spectrum.

As described in commonly assigned U.S. Pat. No. 6,249,398, in a conventional implementation, the analog equalizer 18 comprises a variable gain amplifier (VGA), a low-pass filter, and an adaptive equalizer implemented as a finite impulse response (FIR) filter. The goal is to have the output of the FIR filter match the target response, for example a three-level PR4 signal. The adaptive equalization can be implemented in various ways which are known to those skilled in the art. In the FIR filter, the signal values at the output of each tap are multiplied by a calculated value (a tap weight) and summed to generate the FIR output in analog circuitry. However, tap weight control processing is implemented with digital circuitry. A digital signal processor (DSP) computation unit updates the FIR filter's tap weights using a standard least mean square (LMS) algorithm. The LMS algorithm operates in the time domain to define tap weight coefficients that reduce the mean squared error (MSE) between the sample values and the desired response. Returning to FIG. 1, the equalized signal is converted to digital samples, further equalized in a digital equalizer 22 and finally applied to a Viterbi detector 24.

As mentioned in the background section, the Viterbi algorithm essentially provides an iterative method of determining the maximum likelihood route along the branches of a trellis. The Viterbi detector receives a series of samples, expressed as digital values (e.g. 6 bits) from the FIR filter. The Viterbi detector's task is to take the stream of quantized, sampled values from the FIR filter and, in effect, "decide" which sequence of values is the most likely to have been received. The power of Viterbi detection—and PRML in general—is that it works with sequences of received data rather than single bits (as in peak detection) and compares these sequences of "data" (not user data but filtered read signal samples) with the few known possible sequences to determine which sequence is most likely to have been the actual data. A simple analogy is that of handwriting recognition. Systems that attempt to recognize individual characters often fail, as every individual's writing style is highly variable. Systems that recognize entire words, however, have a much higher success rate. When analyzing the word hello, for example, even if the program cannot decode the letter h, checking the rest of the word hello against an internal dictionary shows that the unrecognizable character should be an "h".

A sequence detector, such as a Viterbi detector, includes a path memory. The present invention will be described as an example of a read/write channel for a disk drive which includes a generic $2^S$ state sequence detector with a latency or path length of L bits. An example conventional read/write channel has a sequence detector where S equals 4 and L equals 12. A latency of L bits means that, normally, the maximum length of the competing paths through the trellis before they merge is L bits (L bit clock cycles). A trellis diagram is obtained by adding a time axis to a sequence detector state diagram.

Figure 2:
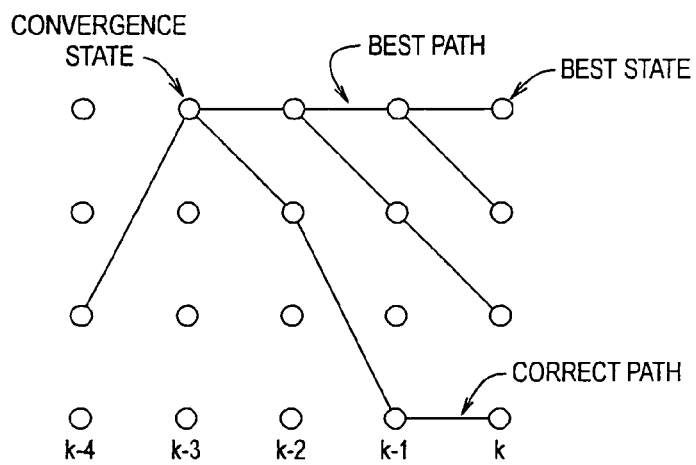
FIG. 2 illustrates a path memory as a two-dimensional trellis for a partial response Viterbi detector.

FIG. 2 illustrates a path memory as a two-dimensional trellis for a partial response polynomial of length $h(D)=1+mD+nD^2$, or S equals 2 and L equals length 12. In the example of FIG. 2, each horizontal row of the trellis represents a particular state vector. For example, the top row has a state vector of 11, the next row a state vector of 10, the third row a state vector of 01 and the lowest row a state vector of 00. The paths through the trellis represent all possible sample sequences. The rightmost column of states represents states and paths from the most recently entered data samples. The leftmost column of states represents the oldest or least recent paths.

In the example of FIG. 2, there are four states and four trellis depths between states established by five bit clock intervals, from right (newest) to left (oldest), k, k–1, k–2, k–3 and k–4. At every depth or level of the trellis, a trace back is made from each state by determining a path metric. In one preferred form, the path metric is the sum of mean squared error on the particular path. The path metric identifies a best state and a best path, as labeled in FIG. 2. There are multiple paths extending along the FIG. 2 trellis. During each clock cycle, the FIG. 2 Viterbi detector updates the four state metrics and selects one of the paths as a survivor path for each of the four states. The survivor path represents the path having the minimum path metric leading to a particular state, and the state metric represents the metric associated with that path. In order to update the state metrics, the detector extends the survivor paths to obtain two paths to each state in the next trellis depth. Each path metric is obtained by adding a state metric to a branch metric, where the branch metric represents the squared Euclidean distance between the current noisy sample and the noiseless sample associated with the branch. In the example of FIG. 2 which includes four states, eight path metrics are calculated during each bit clock cycle and four comparisons are carried out in order to select the survivor paths. Each state transition, i.e. each new read signal sample, results in an output—the ideal value (i.e., ideal channel output)—described by the target polynomial.

In one embodiment, the present invention provides a media noise optimized (MNO) detector that compensates for pattern dependent media noise, and compensates for non-linearities from many sources such as residual MR nonlinearity, residual nonlinear transition shift (NLTS), partial erasure, write-induced nonlinearity, and steady-state misequalization.

Figure 3:
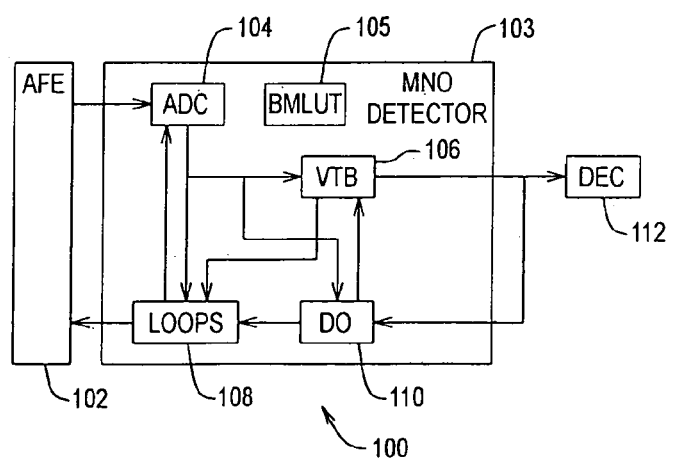
FIG. 3 shows an example block diagram of a channel including aspects of the present invention.

FIG. 3 shows an example block diagram of a channel implementation including aspects of the present invention. The channel (data path) 100 comprises an analog front end (AFE) 102 that provides the analog readback signal, and a media noise optimized (MNO) detector 103 including an analog-to-digital converter (ADC) 104, a detector such as a Viterbi detector (VTB) 106, a LOOPS block 108 and a detector optimization (DO) block 110. The channel 100 further includes a decoder (DEC) 112 within the read path. Because data is encoded in the write process using modulation codes (RLL codes such as (1,7) code, (0,4/4) code or 50/51 code rate, (0,14) and so on), in the read process the data is decoded using the DEC 112 to obtain data in its original, unencoded format. The DEC 112 utilizes the VTB 106 output as the binary data to be decoded. In one example, the MNO detector 103 can comprise a logic circuit or ASIC configured to perform the method of present invention. In another example, the method of the present invention is implemented as firmware and/or software for execution by a processor in the DO block 110.

The DO block 110 uses the ADC 104 samples and the VTB 106 output to generate the parameters (i.e., ideal values d's and scaling factors c's based on the noise variance) in an accumulation process as implemented in equations (2) and (3) below. The VTB 106 output is used to determine the pattern, or the j, in the equations. Typically, the VTB 106 inputs only the ADC 104 samples, however, the d's and c's from the DO block 110 are input to the VTB 106 for scaling the branch metrics. Binary output of the VTB 106 is provided to the DO block 110. Ideally, if noiseless, the input to the VTB 106 can be reconstructed from the VTB 106 output. However, the actual ADC 104 input to the VTB 106 is not perfect (ADC input=ideal signal+noise). The ideal ADC values are reconstructed using the VTB 106, and subtracted from the actual ADC values to determine the noise. Using the DO block 110, the d's and c's are then calculated.

The LOOPS block 108 includes a timing loop, an automatic gain control (AGC) loop, MR nonlinearity asymmetry cancellation (MRAC) block, equalization loop, etc., to ensure adaptation to the correct values. The LOOPS block 108 uses the output of the VTB 106 and the DO block 110 to utilize the d's (and possibly the c's) in the calculation of the signal(s) that drive the loops. The connections between the LOOPS block 108 and the DO block 110 are for using the d's and c's in the LOOPS block 108, and then using the new ADC 104 samples after the LOOPS block 108 has already used the d's and c's to calculate new d's and c's, as described below.

In another example, the MNO detector 103 is implemented by adjusting the conventional Viterbi detector branch metric using the parameters calculated by the DO block 110 so that the ideal values can be nonlinear functions of the state/branch bits, and the branch metric scaling factors are a function of the state/branch (i.e., function of the data). Further, the MNO detector 103 can be retrained to detect and compensate for various data readback signal variations due to various causes, including thermal decay, external DC magnetic field effects on perpendicular recording, etc., and can provide sequence amplitude margin capability.

For a given state/branch, the ideal value is the mean of the ADC 104 samples for the pattern corresponding to the state/branch, and the branch metric scaling factor is proportional to the noise variance for the pattern corresponding to that state/branch. This maximizes the probability of obtaining good read data, and provides an accurate branch metric.

The samples can be denoted as y, the ideal value denoted as $d_j$ and the branch metric scaling factor as $c_j$, wherein j is the branch number (i.e., the length of the partial response target specifies j, such that for a partial target of the form $a_0+a_1 \times D+ \ldots +a_{n-1} \times D^{n-1}$, then $j=1 \ldots 2^n$, wherein n-1 is the order of the partial response target and n is the number of coefficients). The ideal value $d_j$ has both linear and nonlinear components, and is a more accurate representation of the nonlinearities described in the background section. Thus, an example branch metric (BM) for the jth branch suggested by the '839 patent is:

$$BM=(y-d_j)^2/c_j \quad (1)$$

To improve the performance of the channel 100, according to an embodiment of the present invention, the parameters ($d_j$ and $c_j$) of the DO block 110 can be retrained, and training/population calculation for a branch metric lookup table (BMLUT) 105 can be self-contained within the read channel 100. Further, the MNO detector 103 and the DO block 110 can be implemented such that the parameters $d_j$ and $c_j$ are adaptive, read-to-read adaptation, real-time adaptation, etc., described further below). The values for $d_j$ and $c_j$ are obtained for each disk zone (including multiple concentric tracks) or head/surface during a training procedure e.g. at the factory. This is because each zone on the disk has corresponding data dependent noise and non-linearities. Thereafter, the parameters/values are adapted, and the BM values recalculated, as necessary. In the following example, a calculation of the parameters (i.e., d's and c's) of the DO block 110 and training/optimizing the MNO detector 103 as used in the read channel 100 are provided.

Training of the MNO Detector

According to an embodiment of the present invention, to calculate the BM for data sequences (i.e., there are $m=2^n$ branches), the $d_j$ and $c_j$ values are determined for all of $j=1 \ldots 2^n$ different data sequences. For example, for n=5, to calculate the BM for data sequences, the $d_j$ and $c_j$ values are determined for all of $m=2^5=32$ different data sequences (i.e., branches). The following steps are useful with other data sequences, and are not limited to the example below.

The BM training/population may be performed on a per zone basis. The $d_j$ and $c_j$ values can be determined either by using a known pattern or a random (unknown) pattern. If an unknown pattern is used, reliance is made on VTB 106 decisions in calculations of $d_j$ and $c_j$ to determine which branch (i.e., j) the current ADC 104 sample corresponds to. In one version, the $d_j$ and $c_j$ values are obtained according to the following relations (equations):

$$d_j = \frac{1}{N_j}\sum_{i=1}^{N_j} y_{j,i} \quad (2)$$

$$\sigma_j^2 = -d_j^2 + \frac{1}{N_j-1}\sum_{i=1}^{N_j} y_{j,i}^2 \quad (3)$$

$$\sigma^2 = \frac{1}{m}\sum_{j=1}^{m} \sigma_j^2 \quad (4)$$

$$c_j = c\frac{\sigma_j^2}{\sigma^2} \quad (5)$$

wherein $m=2^n$, and $1 \leq j \leq m$ (e.g., n=5 wherein $1 \leq j \leq 32$) is the pattern index (i.e., the branch number), $y_{j,i}$ is the ith occurrence of an ADC 104 sample corresponding to the jth pattern (e.g., wherein $y_{j,i}$ is the ADC 104 sample at time i, and j is the index of the sample $y_{j,i}$), $N_j$ is the number of ADC 104 samples collected for the jth pattern, and $\sigma_j^2$ is the variance of the ADC 104 samples for the jth pattern.

In equation (2), each $d_j$ is the mean for the samples of the corresponding branch. Further, in equation (3) each $\sigma_j^2$ is the variance of the branch j, and in equation (4) $\sigma^2$ is the mean of those variances. Thus, in equation (5), the $c_j$ for each branch is proportional to the ratio of that branch's variance and the mean variance. The parameter c is the average branch metric scaling factor with a nominal value of e.g. c=8. The calculations in equations (2) through (5) above can be performed in the DO block 110.

According to the present invention, the BM values are calculated using the d's and c's, and stored in the BMLUT 105. Then, during disk drive operation, a BM value is obtained from the BMLUT 105. In one example, the BMLUT 105 is populated (programmed) by the DO block 110 and stored in memory in the disk drive. The BMLUT 105 is programmable based on the values of $d_j$ and $c_j$, with the ADC 104 samples as the input and the branch metrics as the outputs.

Before the training of the MNO detector 103 begins, the DO block 110 populates the BMLUT 105 with values corresponding to a linear (flexible) PR target and a constant (i.e., not pattern dependent) variance (i.e., $c_j$=constant C for all j). The MNO training can be performed at the end of disk drive self-scan in the manufacturing process. In an example MNO training, one track of data (per zone) is written with a data pattern, and then such data pattern is read to calculate the $d_j$'s and $c_j$'s as above, wherein the track is free of defects. A pseudo-random sequence pattern can be written to ensure that all patterns (except for the all zeros pattern) are represented.

The BM relation (1) can be improved as:

$$BM = \lfloor (y-d_j)^2/c_j \rfloor_b \qquad (1a)$$

wherein b is the saturation level and indicates the maximum value allowed for the BM. This is equivalent to performing a mathematical "floor" operation on the value $(y-d_j)^2/c_j$ wherein the floor operation involves discarding any fractional portion of the value $(y-d_j)^2/c_j$ and retaining only its integer portion (this eliminates the need for performing floating point arithmetic which is time consuming and requires expensive hardware). Then, if the resulting integer is greater than b, BM is set to b, otherwise BM is set to the integer value.

Re-Training of the MNO Detector

According to the present invention, the MNO detector 103 can be retrained/reprogrammed to detect and compensate for thermal decay and external DC magnetic fields in perpendicular recording, and can provide sequence amplitude margin capability.

If a read operation fails, after one or more retries, the MNO detector 103 can be retrained (i.e., using calculation of ideal values d's and/or scaling factors c's via the DO block 110) to more accurately read the data. A pseudo-random pattern can be used to adapt/retrain the original $d_j$ and $c_j$ values with no loss in accuracy if the training is sufficiently long, regardless of the read signal-to-noise ratio (SNR) and bit error rate (BER). However, there may be some cases where it is desirable to retrain the $d_j$ and $c_j$ values based on unknown data. In that case, the decisions of the VTB 106 are used to select which binary pattern (i.e., j) corresponds to the current ADC 104 sample.

Adaptively retraining the $d_j$ values provides compensation for nonlinear effects that may be changing over time by using unknown data and decisions of the VTB 106 (i.e., on the fly, without writing a special pattern). This provides the option of updating only the $d_j$ values, or both the $d_j$ and $c_j$ values.

Detector Training for TA Defects

Defects in magnetic media, such as data disks in disk drives, can cause data loss or drive damage. Typically, a defect includes a reduction in magnetic material at a certain point on the surface of a magnetic media (e.g., data disk). The reduction of magnetic material below a standard level results in a reduction of the signal amplitude and is referred to as a "dropout". The defect can also include an increase in magnetic material at a certain point on the surface of a magnetic media as a raised feature. The increase in magnetic material above a standard level results in an increase of the signal amplitude and is referred to as a "dropin".

In a disk drive, if the raised feature on the data disk media is high enough to hit the read head, the resulting friction causes heating of the head, which in magneto-resistive heads generates an unwanted voltage transient at the output of the head. The transient voltage is referred to as a thermal asperity (TA), and the corresponding defect is referred to as a TA defect. Another type of thermal asperity (TA) may occur when the head hits a particle on the disk surface. In such case, the head heats up after hitting the particle, which in MR heads causes the MR element resistance to increase, and in turn causes the head voltage to increase. During the end of TA recovery, the disturbance due to the TA appears as a baseline shift or offset for some period of time. This can cause the branch metric in relation (1a) to saturate due to the saturation level setting b, which indicates the maximum value allowed for the BM. When the BM value saturates, the original signal information from the ADC 104 sample y is lost.

According to the present invention, increased tolerance against this saturation can be achieved by increasing the branch metric scaling factor c to reduce the TA interference that is dominating the base data signal. However, increasing the scaling factor c may increase quantization noise. The scaling factor c is selected (e.g., optimized) to reduce the saturation effect, but without unduly increasing the quantization noise.

In addition, better results may be obtained by setting $c_j$ to a selected constant value, for all j. A scaling factor c having a value of c=10 or 12 provides a good compromise. Other optimized values of scaling factor c are also possible. As the present invention provides for a programmable BMLUT 105, reprogramming the BMLUT 105 can increase tolerance against the baseline shift. This capability can be provided on a re-read if the initial read is unsuccessful and a TA was detected.

Detector Training for Thermal Decay

Recorded signal amplitudes can decay in time, known as thermal decay. The decay affects certain data patterns more than others (e.g., 010101 has more decay than 000000 or 111111, because 010101 has more 0-1 transitions), wherein each pattern has corresponding d's. Thermal decay affects closely-spaced transitions more severely, due to the demagnetization field, and manifests as a pattern-dependent nonlinearity. The MNO detector 103 is used to detect and compensate for thermal decay according to the present invention.

Because original d's were calculated when the data was first written, at a later time, a read attempt failure may occur due to thermal decay. Due to later thermal decay, the read ADC 104 samples are smaller in magnitude than expected when the original d's were calculated. Thermal decay is detected by retraining DO block 110 parameters and testing for a reduction in magnitude of the ideal value $d_j$ for certain patterns corresponding to closely-spaced transitions. Because thermal decay is generally pattern dependent, an updated BMLUT 105 (based on the retrained parameters) provides better performance in reading back the data if thermal decay has occurred.

The retraining is performed by reading disk sector(s) where the thermal decay occurred one or more times to obtain temporary $d_j$ values (and possibly also $c_j$ values). Then, new d's are calculated and new BM values with the new d's are obtained to provide a more accurate branch metric, so as to account for effects of thermal decay on data detection. The new BM values are used to temporarily re-populate the BMLUT 105. All parameters that are dependent on the new d's and/or c's are also updated at this point. Once the data has been read successfully, the data should be rewritten, and the BMLUT 105 can be restored to its original values (using the original $d_j$ and $c_j$ values saved to e.g. DRAM).

As an alternative to the approach described above where the $d_j$ values are retrained on the affected data, an adjustment could be made to the original $d_j$ and/or $c_j$ values based on some prior knowledge of the physics of thermal decay (e.g., if there is thermal decay, there is prior knowledge based on experimentation that the d's lose 20% of their value, and so the d's are adjusted to compensate for that loss). For example, a known pattern may be written in the disk inner cylinder during self-scan and periodically tested for thermal decay (preferably, the known pattern is of sufficient length to provide noise averaging).

Periodically (e.g., every month or every certain number of uses, etc.), a search is performed for certain data patterns on the disk that are prone to thermal decay. Retraining is performed to obtain new d's, and the difference between the new d's and the original d's is obtained as a measure of thermal decay. If the thermal decay exceeds a threshold, the affected data is written again to eliminate the effect of thermal decay, before thermal decay increases to a point where it causes read errors or data loss. The original d's are saved and can then be used to read the re-written data.

Training of the Detector for External DC Magnetic Fields

External DC magnetic fields oriented in a transverse direction to the disk surface can significantly degrade the playback performance of certain data patterns with closely-spaced bit transitions, as in perpendicular recording. During disk drive manufacturing, the ideal values d's are determined without the ability to control the effect of such magnetic fields on data. To account for effects of DC magnetic fields after the original d's have been calculated during disk drive manufacturing, a process similar to that for handling thermal decay is used. For example, if recorded signal degradation due to DC magnetic fields is detected, the ideal values are recalculated (adapted) to obtain a more accurate branch metric for data detection to enable reading the data.

In one case, to detect data degradation due to DC magnetic fields, new ideal values d's are determined based on the data believed to be affected. The new ideal values are compared with the original ideal values, such that if a threshold is exceeded, it indicates data degradation due to DC magnetic fields. The data can be written again to eliminate the degradation.

In perpendicular recording, an external DC field oriented in a perpendicular direction shifts transitions of one polarity in one direction, and transitions of the other polarity in the opposite direction. The MNO detector 103 can compensate for such effects by adaptively recalculating of the parameters in the DO block 110 for every zone (i.e., after the external DC fields have been established). This retraining provides more accurate branch metrics and good bit error rate. In cases where data is read and written again to alleviate data degradation (e.g., due to thermal decay, external DC magnetic fields, etc.) while reading data, statistics are accumulated for the new d's and new c's for relations (2) and (3) above (i.e., for summation of y's and $y^2$'s).

Detector Read-To-Read Adaptation

Even if data can be read with an acceptable bit error rate (or for certain d's, the amplitude is reduced by a certain amount), it may be desirable to read certain data and rewrite again. When the original d's and c's are initially determined (e.g., at the factory), for each d and/or c, multiple read/write samples are used to obtain accurate d's and c's. However, in the read-retry mode, only a few number of sectors are in error, and estimated d's and c's are determined based only on those samples. As such, it may not be desirable to abandon the original d's and c's and use the estimated d's and/or c's for reading the remaining data.

Thus, in one case, the original d's and the estimated d's are averaged to obtain new d's. In this case, because the estimated d's and c's are based on a few samples (in relation to the original d's and c's), the averaging is performed using a weighing factor. The weighting factor may favor the estimated d's which are more suitable for reading the sectors in error. Besides averaging, the new d's can be obtained based on other combinations of the original d's and the estimated d's depending on the desired influence of each on the new d's.

An example read-to-read adaptation can be accomplished by (1) accumulating statistics for the $d_j$ values using the DO block 110 while reading from a disk area or zone, (2) when leaving the zone, determining whether a statistically sufficient number of samples have been accumulated for each $d_j$ value, and (3) for each $d_j$ value with a sufficient number of samples, updating the stored $d_j$ value as follows:

$$d_{j_{new}} = (1-\alpha)d_j^{old} + \alpha d_j^{est} \qquad (6)$$

wherein the $d_j^{old}$ values are the original d's, the $d_j^{est}$ values are the estimated value of d's (i.e., $d_j$'s) obtained while reading from the current zone, and $\alpha$, $0 \leq \alpha \leq 1$, is a weighting factor proportional to the number of sectors that were read during the current visit to the zone.

Each $d_j^{est}$ value is calculated by the DO block 110. The weighting equation (6) can be implemented in firmware in the DO block 110. The updated/adapted d's (i.e., $d_j^{new}$) are used for the next read of the sector/zone to repopulate the BMLUT 105 and calculate other parameters.

For example, if $N_j = 1000$ such that there are 1000 ADC 104 samples for a particular branch j, and if there are 2000 samples for that branch on read-retry, 1000 samples are used to calculate $d_j^{old}$ and 2000 samples are used to calculate $d_j^{est}$. Because $d_j^{est}$ is more accurate (i.e., more samples are used in its calculation) then in calculating $d_j^{new}$ the weighing factor $\alpha$ is selected such that $d_j^{est}$ has a higher contribution than $d_j^{old}$ in determining $d_j^{new}$ (e.g., $\alpha = 2/3$, etc.). In one example, $\alpha$ is a weighting factor proportional to the number of samples in the sector for a branch.

In this example, once the data sectors in error are read using the updated d's (i.e., $d_j^{new}$), the BMLUT 105 is restored using the original d's (i.e., $d_j^{old}$) and other data sectors are read using the original d's. Further, similar steps as above can be performed for determining new c's based on original and estimated c's (e.g., for read-retry).

Detector Real-Time Adaptation

Another approach to calculating the d's is as follows. The $d_j$ values can be adapted in real-time, implemented using a standard least mean square (LMS) algorithm according to the following relation:

$$d_j^{k+1} = d_j^k + \mu e_k \qquad (7)$$

wherein $e_k = y_{j,k} - d_j^k$ is the error signal at time k, and $\mu$ is the LMS step size. For true real-time adaptation, the approach using the BMLUT 105 discussed above can be used and the final non-linear $d_j$'s are updated on the fly. This approach is less hardware intensive than certain other approaches.

Detector Training Steps

Figure 4A:
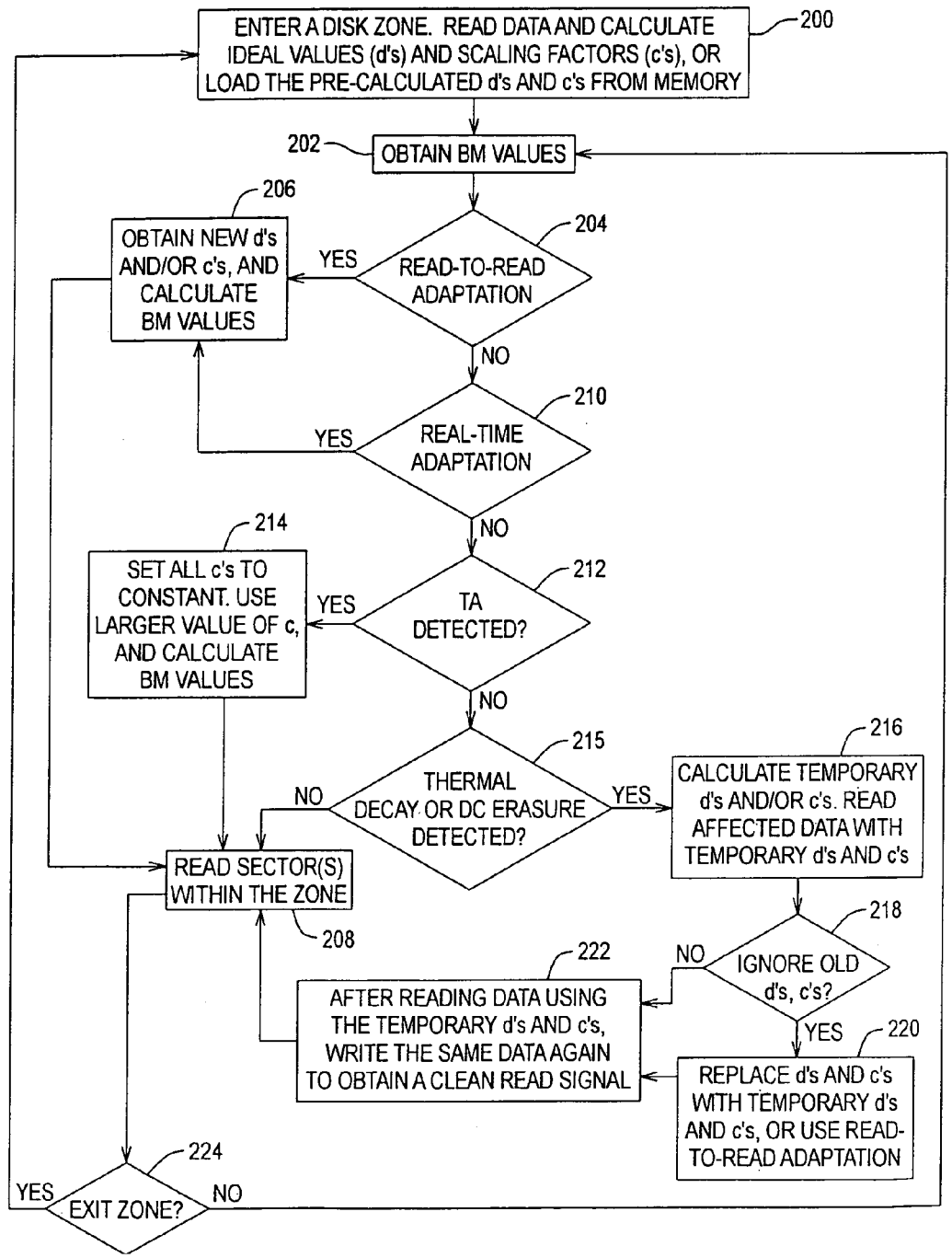
FIG. 4A shows an example flowchart of detector retraining according to an embodiment of the present invention.

Referring to the example flowchart in FIG. 4A, an embodiment of the above steps of retraining the MNO detector 103 according to one embodiment of the present invention is shown. During disk drive operation, for reading data from a sector in a zone, the d's and c's can be calculated in real-time, or precalculated values are obtained from the BMLUT 105 (e.g., stored in RAM) (step 200). Then, the BM values are calculated (or precalculated values in the BMLUT 105 are used) (step 202). Then, if it is determined that read-to-read adaptation is required (step 204), new d's and c's are obtained and the BM values are re-calculated (step 206). Then, sectors in the zone are read (step 208). After step 204, it is then determined if real-time adaptation is required (step 210), and if so, steps 206 and 208 are performed for real-time adaptation. In one example, for read-to-read adaptation and real-time adaptation modes, preferably the determination is made once and applied to the whole drive.

After step 210, if a TA is detected (step 212), then all c's are set to a constant value, the BM values are calculated (step 214), and the data sectors in the zone are read again (step 208). After step 212, if thermal decay, or erasure due to DC magnetization fields, is detected (step 215), then new (temporary) d's and c's are determined, the BM values are obtained, and data is read based on the new d's and c's (step 216). Then, a determination is made if the original (old) d's and c's are to be replaced (step 218), and if so, the original (old) d's and c's are replaced with the new (temporary) values and thereafter, read-to-read adaptation is performed for reading data (step 220). The process then proceeds to the next read (step 222).

If in step 218, the original (old) d's and c's are not to be replaced (i.e., not ignored), then after reading data using the new d's and c's, the read data is written again to obtain a better read signal for the next read (step 222). The process then proceeds to step 208 and sectors in the zone are read. After step 208, a determination is made whether to exit the zone (step 224), and if so, the process proceeds to step 200 for the next zone, otherwise, the process proceeds to step 202 for the next sector in the zone.

In one embodiment, it is known in advance whether read-to-read adaptation is selected (e.g., a selection made by the disk drive manufacturer) and does not change from disk zone to zone. However, the TA and thermal decay/DC erasure effects are determined for each sector read since such effects can occur at any moment. Other implementations are possible and, to those skilled in the art, are obvious variations of that described herein (e.g., FIG. 4A).

Figure 4B:
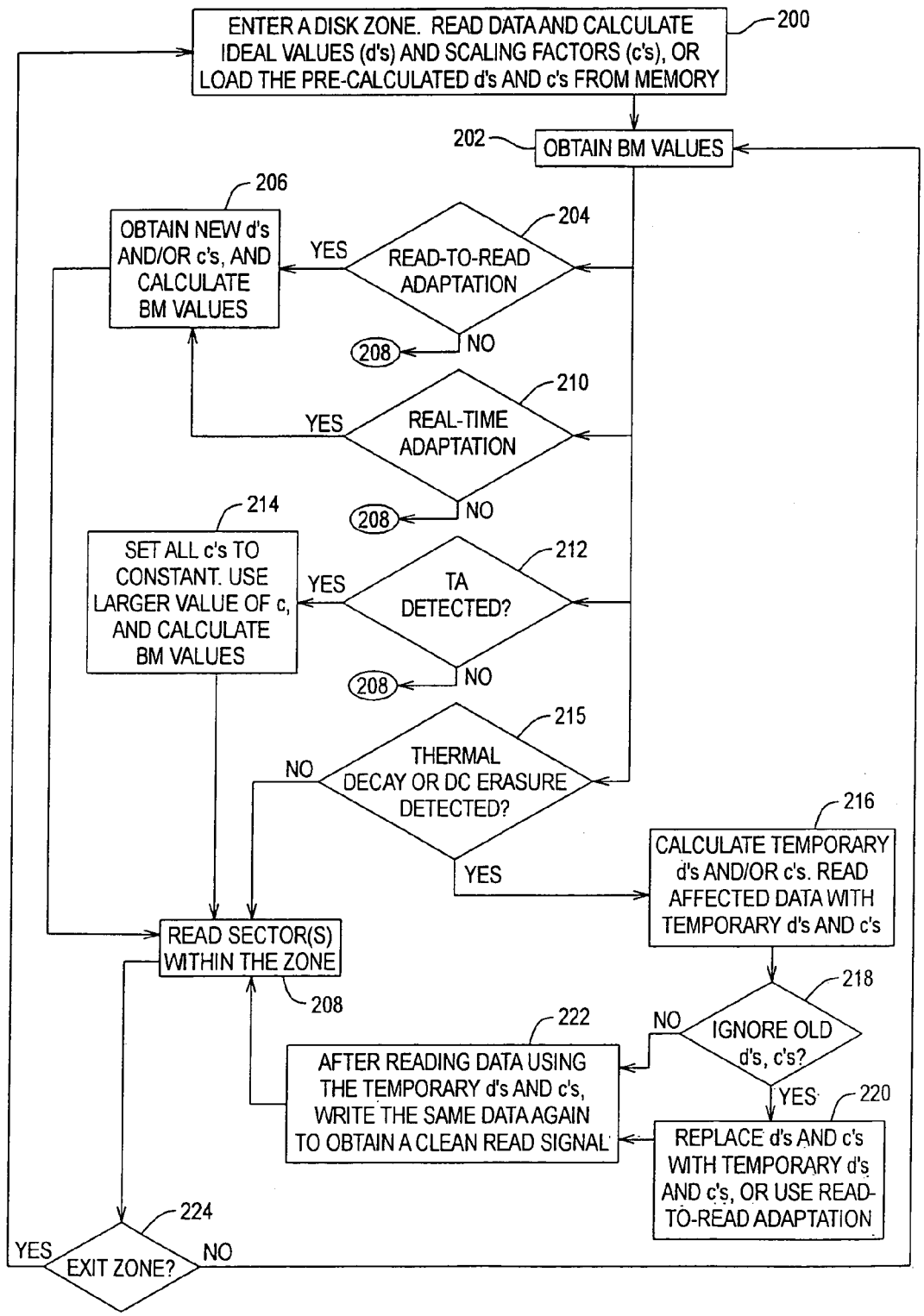
FIG. 4B shows another example flowchart of detector retraining according to another embodiment of the present invention.

Although in the example flowchart of FIG. 4A the decision steps 204, 210, 212 and 215 are shown to occur in sequence, as shown by another example flowchart in FIG. 4B, any of the decision steps 204, 210, 212 and 215 can be selectively accessed after step 202.

Alternative BM Approach

An alternative approach to determine the BM values according to the present invention is according to the following relations:

$$x = y - d_j \quad (8)$$

$$z = \log_a(x^2) \quad (9)$$

$$w = z - \log_a(c_j) \quad (10)$$

$$BM = a^w \quad (11)$$

The above relations (9) through (11) can be implemented using mathematical function lookup tables to save calculation cycles, wherein such an approach requires 3 clock cycles. In the first clock cycle x is calculated, then in the second clock cycle both z and w are calculated (e.g., using two logarithm lookup tables), and in the third clock cycle BM is calculated. The log and antilog lookup tables for relations (9) through (11) need not be programmable, and can be implemented with ROM rather than RAM. The approach of relations (8) through (11) allows real-time update of the devalues, wherein:

$$w = 2 \log_a(y - d_j) - \log_a(c_j), \quad (12)$$

$$BM = a^w$$

Using the DO block 110 for the above calculations, the MNO detector 103 compensates for pattern dependent media noise, and compensates for nonlinearities from many sources, including for example, residual MR nonlinearity, residual nonlinear transition shift (NLTS), partial erasure, write-induced nonlinearity, and steady-state mis-equalization.

Improving Data Detection

To further improve data detection according to the present invention, during the training of the parameters (i.e., adaptation of d's and c's), a comparison according to relation (13) below can be performed to eliminate samples y that are outside a desirable range (e.g., due to factors such as TA, etc.):

$$|y_{j,i} - \hat{d}_j| > T \quad (13)$$

wherein $\hat{d}_j$ is the linear ideal value (or previously stored nonlinear ideal value), $y_{j,i}$ is the ADC 104 sample at time i, and j is the index of the n-bit (e.g., 5-bit) pattern, and T is a threshold for the maximum allowed difference. If the difference value exceeds the threshold T, statistics for the ADC 104 sample are not accumulated (to increase accuracy) and a counter is incremented to keep track of the number of times the threshold T was exceeded.

Thresholding the difference between the ADC 104 samples and the ideal values is helpful in preventing VTB 106 errors from affecting the estimates of the $d_j$ and $c_j$ values. This feature is beneficial if the VTB 106 is used to identify the written pattern so as to reduce the effect of detector errors on the calculation of the $d_j$ and $c_j$ parameters/values. This feature is also useful as a diagnostic for bench testing, detecting problems during self-scan such as sync slip, and for preventing defects and thermal asperities (TA) from affecting the calculation of these parameters by the DO block 110 (preferably training of the parameters is performed using data that is free from defects and TAs).

Branch Metric Modifications

It is desirable to reduce the bit error rate (BER) (such as $1 \times 10^{-6}$, $1 \times 10^{-7}$) to improve the performance of the channel 100. However, this requires gathering many statistical values to select channel parameters. It is also important to reduce the optimization time.

Sequence amplitude margin (SAM) provides a means of accelerating error statistics collection by margining. Sequence amplitude margin is a phrase used to refer to steps that help obtain statistics more quickly (e.g., obtaining BER statistics more quickly). This is useful for channel optimization where many parameters have to be optimized and set. The present invention also provides a method of approximating SAM by artificially (i.e., intentionally) degrading the channel performance such that the collection of error statistics is accelerated in a representative and realistic manner.

In one example, a sequence amplitude margin option is provided such that the branch metric expression is according to the following relation:

$$BM = \lfloor (y-(1+\alpha)d_j)^2/c_j \rfloor_b \qquad (14)$$

wherein the amount of degradation or error acceleration is proportional to $\alpha$, and $\alpha \geq 0$.

By multiplying d with $(1+\alpha)$, noise is artificially increased proportional to $(1+\alpha)$. This allows more statistics to be gathered quickly, and allows faster optimization. As such, instead of $d_j$, the values $(1+\alpha)d_j$ are provided to the MNO detector 13 (e.g., to the DO block 110) to determine the BM using relation (14). Without this feature, many data samples may need to be accumulated to determine the d's and/or c's to achieve a reasonable BER. For example, for a BER of $1 \times 10^{-6}$ (i.e., for every million bits, one is in error), to obtain statistically significant values, at least 100 errors must be observed. Thus, 100 million bits of data must be written and read. However, as described above, by intentionally degrading performance such that the BER is $1 \times 10^{-4}$, to obtain the 100 bits in error, the time to write and read data is $\frac{1}{100}^{th}$ of the case where the BER is $1 \times 10^{-6}$. Accordingly, significant time is saved.

Optimal Branch Metric Expression

It should be noted that the branch metric expression shown in relation (1a) above is a simplification of the optimal branch metric relation:

$$BM = \left\lfloor -\frac{2\sigma^2}{c} \log\left(\frac{1}{\sqrt{2\pi\sigma_i^2}}\right) + \frac{(y-d_i)^2}{c_i} \right\rfloor_b \qquad (15)$$

The branch metric relation (15) can be used instead of the branch metric relation (1a). However, channel performance improvement using relation (15) can be small, and relation (1a) can be used instead.

Disk Drive Implementation

FIG. 5 shows a block diagram of an example disk drive 300 which implements the features of the present invention. The disk drive 300 is connected to a host computer 325 via a bus 323. The disk drive 300 includes electronics 340 comprising a servo controller 315 for servo control of the disk drive 300, a control unit or controller 317 for controlling components of the disk drive 300, a processor 327 primarily for controlling data flow communications with the host computer 325 via an interface 319 and bus 323, and a read/write channel 321 for processing data transferred between a data disk 311, the host computer 325, the servo controller 315 and the controller 317. A preamplifier 328 is used to amplify signals read by one or more transducers 326. Alternatively, the servo controller 315 can be a component of the controller 317. The disk drive 300 receives read and/or write requests from the host computer 325 and carries out the requests by performing data transfers between itself and the host computer 325.

The interface 319 provides an interface between the disk drive 300 and the host computer 325. During read and write operations, the interface 319 provides a communications path, that includes data buffering functions, between the host computer 325 and the read/write channel 321. In addition, the interface 319 receives commands and requests from the host computer 325 and directs them to the controller 317. The controller 317 then carries out the commands by appropriately controlling the elements within the disk drive 300.

A voice coil motor (VCM) 369 controllably positions the transducers 326 with respect to their corresponding disk surfaces in response to a control signal generated by the servo controller 315. The transducers 326 are coupled to the single integrated arm assembly 367 and thus move together under the influence of the VCM 369. When performing a read or write operation, the controller 317 instructs the servo controller 315 to move one of the transducers 326 to a target track on a corresponding disk surface so that a data transfer can take place. The read/write channel 321 receives an amplified signal from the preamplifier 328. The read/write channel 321 is implemented based on the architecture for the channel 100 described above. For instance, the read/write channel 321 can be a chip. Further, one or more functions of the read/write channel 321 can be performed by other components of the electronics 340, such as in the disk controller 317 by the processor 327 according to firmware 371.

The present invention has been described in considerable detail with reference to certain preferred versions thereof; however, other versions are possible. For example, in other embodiments, the present invention is useful in other data storage devices such as tape drives as those skilled in the art will recognize. Therefore, the spirit and scope of the appended claims should not be limited to the description of the preferred versions contained herein.

The invention claimed is:

1. In a data channel for a data storage device having a magnetic data storage media and a transducer for recording/playback of data on the media, the channel including a detector having multiple states arranged for maximum likelihood decoding of a series of sample bits with pattern dependent noise and nonlinearities to form a series of detected bits, a method of determining branch metrics for branches of a trellis corresponding to the multiple states in the detector, wherein each branch j connects two of the states, the method comprising the steps of:
    (a) determining an ideal value $d_j$ as a function of the corresponding sample bits;
    (b) determining a difference between the ideal value $d_j$ and a sample value y represented by the corresponding sample bits;
    (c) determining a branch metric scaling factor $c_j$ as a function of the noise variance for the corresponding sample bits;
    (d) generating the branch metric BM as a function of the difference and the scaling factor $c_j$; and
    (e) performing read-to-read adaptation of the ideal value $d_j$ using statistics accumulated for other $d_j$ values read from the media.

2. The method of claim 1, wherein step (c) further includes the step of:
    detecting if there is a baseline shift in a read signal due to a thermal asperity, and if so, selecting the scaling factor $c_j$ for reducing the effect of the baseline shift.

3. The method of claim 1, wherein step (c) further includes the step of:
    detecting if there is a baseline shift in a read signal due to external magnetic fields, and if so, selecting the scaling factor $c_j$ for reducing the effect of the external magnetic fields.

4. The method of claim 1, wherein the data storage device is a tape drive.

5. The method of claim 1, wherein the data storage device is a disk drive.

6. In a data channel for a magnetic recording and playback system, the channel including a detector having multiple states arranged for maximum likelihood decoding of a series of sample bits with pattern dependent noise and nonlinearities to form a series of detected bits, a method of determining branch metrics for branches of a trellis corresponding to the multiple states in the detector, wherein each branch j connects two of the states, the method comprising the steps of:

for each branch j:
  (a) determining an ideal value $d_j$ as a function of the corresponding sample bits;
  (b) determining a difference between the ideal value $d_j$ and a sample value y represented by the corresponding sample bits;
  (c) determining a branch metric scaling factor $c_j$ as a function of the noise variance for the corresponding sample bits; and
  (d) generating the branch metric BM as a function of the difference and the scaling factor $c_j$; and performing read-to-read adaptation of the ideal values $d_j$'s by:
  accumulating statistics for the ideal values $d_j$'s while reading from a disk zone having multiple sectors; and
  for each ideal value $d_j$, obtaining a new ideal value $d_j^{new}$ as a function of the existing ideal value $d_j^{old}$ and an estimated ideal value $d_j^{est}$ wherein the estimated ideal value $d_j^{est}$ is the estimated value of the existing ideal value $d_j^{old}$ obtained while reading from the zone.

7. The method of claim 6 wherein the step of determining each new ideal value $d_j^{new}$ is essentially according to the relation:

$$d_j^{new} = (1-\alpha)d_j^{old} + \alpha d_j^{est}$$

wherein $\alpha$, $0 \leq \alpha \leq 1$, is a weighting factor proportional to the number of sectors read from the zone.

8. The method of claim 6 wherein:
in step (a) the ideal value $d_j$ is based on the mean of the corresponding sample bits; and
in step (c) the scaling factor $c_j$ is proportional to the noise variance for the corresponding sample bits.

9. The method of claim 8, wherein the branch metric for each branch j is represented by the relation:

$$BM = \lfloor (y-d_j)^2 / c_j \rfloor_b$$

wherein:
  y represents the corresponding sample bits,
  $d_j$ represents the ideal value,
  $c_j$ represents the scaling factor, and
  b is the saturation level.

10. The method of claim 9, wherein $d_j$ and $c_j$ are determined by:
writing a data pattern in a track per zone; and
for each zone, reading the written data, and calculating $d_j$ and $c_j$ according to the relations:

$$d_j = \frac{1}{N_j} \sum_{i=1}^{N_j} y_{j,i},$$

$$\sigma_j^2 = -d_j^2 + \frac{1}{N_j - 1} \sum_{i=1}^{N_j} y_{j,i}^2,$$

$$\sigma^2 = \frac{1}{m} \sum_{j=1}^{m} \sigma_j^2,$$

$$c_j = c \frac{\sigma_j^2}{\sigma^2}$$

wherein:
  $y_{j,i}$ is the ith corresponding sample bit for the jth branch,
  $N_j$ is the number of the corresponding sample bits for the jth branch,
  $\sigma_j^2$ is the variance of the corresponding sample bits for the jth branch,
  c is an average branch metric scaling factor, and
  m is the number of the trellis branches.

11. The method of claim 8, wherein the branch metric for each branch j is represented by the relations:

$$w = 2\log_a(y-d_j) - \log_a(c_j),$$

$$BM = a^w$$

wherein a is the logarithm base.

12. The method of claim 11, wherein $d_j$ and $c_j$ are determined by:
writing a data pattern in a track per zone; and
for each zone, reading the written data, and calculating $d_j$ and $c_j$ according to the relations:

$$d_j = \frac{1}{N_j} \sum_{i=1}^{N_j} y_{j,i},$$

$$\sigma_j^2 = -d_j^2 + \frac{1}{N_j - 1} \sum_{i=1}^{N_j} y_{j,i}^2,$$

$$\sigma^2 = \frac{1}{m} \sum_{j=1}^{m} \sigma_j^2,$$

$$c_j = c \frac{\sigma_j^2}{\sigma^2}$$

wherein:
  $y_{j,i}$ is the ith corresponding sample bit for the jth branch,
  $N_j$ is the number of the corresponding sample bits for the jth branch,
  $\sigma_j^2$ is the variance of the corresponding sample bits for the jth branch,
  c is an average branch metric scaling factor, and
  m is the number of the trellis branches.

13. The method of claim 6, further including the steps of:
accumulating statistics for the scaling factors $c_j$'s while reading from the zone; and
for each $c_j$, obtaining a new scaling factor $c_j^{new}$ as a function of the existing scaling factor $c_j^{old}$ and an estimated scaling factor $c_j^{est}$ wherein the estimated scaling factor $c_j^{est}$ is the estimated value of the existing scaling factor $c_j^{old}$ obtained while reading from the zone.

14. In a data channel for a magnetic recording and playback system, the channel including a detector having multiple states arranged for maximum likelihood decoding of a series of sample bits with pattern dependent noise and nonlinearities to form a series of detected bits, a method of determining branch metrics for branches of a trellis corresponding to the multiple states in the detector, wherein each branch j connects two of the states, the method comprising the steps of:

for each branch j:
- (a) determining an ideal value $d_j$ as a function of the corresponding sample bits;
- (b) determining a difference between the ideal value $d_j$ and a sample value y represented by the corresponding sample bits;
- (c) determining a branch metric scaling factor $c_j$ as a function of the noise variance for the corresponding sample bits; and
- (d) generating the branch metric BM as a function of the difference and the scaling factor $c_j$;

wherein the branch metric for each branch j is represented by the relations:

$$w = 2\log_a(y-d_j) - \log_a(c_j),$$

$$BM = a^w$$

wherein a is the logarithm base.

15. The method of claim 14, wherein:
- in step (a) the ideal value $d_j$ is based on the mean of the corresponding sample bits; and
- in step (c) the scaling factor $c_j$ is proportional to the noise variance for the corresponding sample bits.

16. The method of claim 15, wherein $d_j$ and $c_j$ are determined by:
- writing a data pattern in a track per zone; and
- for each zone, reading the written data, and calculating $d_j$ and $c_j$ according to the relations:

$$d_j = \frac{1}{N_j}\sum_{i=1}^{N_j} y_{j,i},$$

$$\sigma_j^2 = -d_j^2 + \frac{1}{N_j-1}\sum_{i=1}^{N_j} y_{j,i}^2,$$

$$\sigma^2 = \frac{1}{m}\sum_{j=1}^{m}\sigma_j^2,$$

$$c_j = c\frac{\sigma_j^2}{\sigma^2}$$

wherein:
- $y_{j,i}$ is the ith corresponding sample bit for the jth branch,
- $N_j$ is the number of the corresponding sample bits for the jth branch,
- $\sigma_j^2$ is the variance of the corresponding sample bits for the jth branch,
- c is an average branch metric scaling factor, and
- m is the number of the trellis branches.

17. The method of claim 14, further comprising performing read-to-read adaptation of the $d_j$ values, including the steps of:
- (i) accumulating statistics for the $d_j$ values while reading from a disk zone having multiple sectors, and
- (ii) for each $d_j$ value with a sufficient number of samples, updating stored $d_j$ values based on the relation:

$$d_j^{new} = (1-\alpha)d_j^{old} + \alpha d_j^{est}$$

wherein $d_j^{est}$ is the estimated value of $d_j$ obtained while reading from the zone, and $\alpha$, $0 \leq \alpha \leq 1$, is a weighting factor proportional to the number of sectors read from the zone.

18. The method of claim 14, further comprising performing real-time adaptation of the $d_j$ values, including the step of:

adapting a $d_j$ value using a least mean square (LMS) algorithm according to the relation:

$$d_j^{k+1} = d_j^k + \mu e_k$$

wherein $e_k = y_{j,k} - d_j^k$ is the error signal at time k, and $\mu$ is the LMS step size.

19. In a data channel for a data storage device having a magnetic data storage media and a transducer for recording/playback of data on the media, the channel including a detector having multiple states arranged for maximum likelihood decoding of a series of sample bits with pattern dependent noise and nonlinearities to form a series of detected bits, a method of determining branch metrics for branches of a trellis corresponding to the multiple states in the detector, wherein each branch j connects two of the states, the method comprising the steps of:
- (a) determining an ideal value $d_j$ as a function of the corresponding sample bits for each branch j;
- (b) determining a difference between the ideal value $d_j$ and a sample value y represented by the corresponding sample bits;
- (c) determining a branch metric scaling factor $c_j$ as a function of the noise variance for the corresponding sample bits and a baseline shift in a read signal due to a thermal asperity, detecting if there is the baseline shift in the read signal due to a thermal asperity, and if so, selecting the scaling factor $c_j$ for reducing the effect of the baseline shift while maintaining quantization noise within acceptable levels; and
- (d) generating the branch metric BM as a function of the difference and the scaling factor $c_j$.

20. The method of claim 19, wherein the baseline shift causes the branch metric to saturate.

21. The method of claim 19, wherein step (c) further includes selecting the scaling factor $c_j$ as a constant for reducing the effect of the baseline shift.

22. The method of claim 19, wherein step (c) further includes selecting the scaling factor $c_j$ as a constant of about 10 to 12 for reducing the effect of the baseline shift.

23. The method of claim 19, further comprising performing read-to-read adaptation of the ideal value $d_j$ using statistics accumulated for other $d_j$ values read from the media.

24. In a data channel for a data storage device having a magnetic data storage media and a transducer for recording/playback of data on the media, the channel including a detector having multiple states arranged for maximum likelihood decoding of a series of sample bits with pattern dependent noise and nonlinearities to form a series of detected bits, a method of determining branch metrics for branches of a trellis corresponding to the multiple states in the detector, wherein each branch j connects two of the states, the method comprising the steps of:
- (a) determining an ideal value $d_j$ as a function of the corresponding sample bits for each branch j, wherein the ideal value $d_j$ is based on the mean of the corresponding sample bits;
- (b) determining a difference between the ideal value $d_j$ and a sample value y represented by the corresponding sample bits;

(c) determining a branch metric scaling factor $c_j$ as a function of the noise variance for the corresponding sample bits and a baseline shift in a read signal due to a thermal asperity, wherein the scaling factor $c_j$ is proportional to the noise variance for the corresponding sample bits; and (d) generating the branch metric BM as a function of the difference and the scaling factor $c_j$.

25. The method of claim 24, wherein $d_j$ and $c_j$ are determined by:

writing a data pattern in a track per zone; and for each zone, reading the written data, and calculating $d_j$ and $c_j$ according to the relations:

$$d_j = \frac{1}{N_j} \sum_{i=1}^{N_j} y_{j,i},$$

$$\sigma_j^2 = -d_j^2 + \frac{1}{N_j - 1} \sum_{i=1}^{N_j} y_{j,i}^2,$$

$$\sigma^2 = \frac{1}{m} \sum_{j=1}^{m} \sigma_j^2,$$

$$c_j = c \frac{\sigma_j^2}{\sigma^2}$$

wherein:

$y_{j,i}$ is the ith corresponding sample bit for the jth branch, $N_j$ is the number of the corresponding sample bits for the jth branch, $\sigma_j^2$ is the variance of the corresponding sample bits for the jth branch, c is an average branch metric scaling factor, and m is the number of the trellis branches.

26. In a data channel for a data storage device having a magnetic data storage media and a transducer for recording/playback of data on the media, the channel including a detector having multiple states arranged for maximum likelihood decoding of a series of sample bits with pattern dependent noise and nonlinearities to form a series of detected bits, a method of determining branch metrics for branches of a trellis corresponding to the multiple states in the detector, wherein each branch j connects two of the states, the method comprising the steps of:

(a) determining an ideal value $d_j$ as a function of the corresponding sample bits for each branch j;

(b) detecting if there is degradation in the recorded data due to thermal decay, and if so, adapting the ideal value $d_j$ as a function of the thermal decay;

(c) determining a difference between the ideal value $d_j$ and a sample value y represented by the corresponding sample bits;

(d) determining a branch metric scaling factor $c_j$ as a function of the noise variance for the corresponding sample bits; and (e) generating the branch metric BM as a function of the difference and the scaling factor $c_j$.

27. The method of claim 26, wherein in step (b) the ideal value $d_j$ is adapted as a function of the corresponding sample bits affected by the thermal decay.

28. The method of claim 27, wherein step (b) further includes the steps of:

determining a new ideal value as a function of the corresponding sample bits affected by the thermal decay;

comparing the new ideal value and an original ideal value calculated when the data was previously recorded on the media; and determining whether the difference between the new ideal value and the original ideal value exceeds a threshold value.

29. The method of claim 27, further comprising the step of:

(f) if the degradation is detected, then reading the data affected by the thermal decay using the branch metric based on the adapted ideal value, re-writing the data and then using the original ideal value for reading the data while the data is not affected by the thermal decay.

30. The method of claim 27, wherein:

in step (a) the ideal value $d_j$ is based on the mean of the corresponding sample bits; and in step (d) the scaling factor $c_j$ is proportional to the noise variance for the corresponding sample bits.

31. The method of claim 26, wherein in step (b) the ideal value $d_j$ is adjusted based on prior knowledge of thermal decay to compensate for the thermal decay.

32. The method of claim 31, further comprising the step of:

(f) if the degradation is detected, then reading the data affected by the thermal decay using the branch metric based on the adapted ideal value, re-writing the data and then using the original ideal value for reading the data while the data is not affected by the thermal decay.

33. In a data channel for a data storage device having a magnetic data storage media and a transducer for recording/playback of data on the media, the channel including a detector having multiple states arranged for maximum likelihood decoding of a series of sample bits with pattern dependent noise and nonlinearities to form a series of detected bits, a method of determining branch metric for branches of a trellis corresponding to the multiple states in the detector, wherein each branch j connects two of the states, the method comprising the steps of:

(a) determining an ideal value $d_j$ as a function of the corresponding sample bits for each branch j;

(b) detecting if there is degradation in the recorded data due to external magnetic fields, and if so, adapting the ideal value $d_j$ as a function of the corresponding sample bits affected by the external magnetic fields;

(c) determining a difference between the ideal value $d_j$ and a sample value y represented by the corresponding sample bits;

(d) determining a branch metric scaling factor $c_j$ as a function of the noise variance for the corresponding sample bits; and (e) generating the branch metric BM as a function of the difference and the scaling factor $c_j$.

34. The method of claim 33, wherein step (b) further includes the steps of:

determining a new ideal value as a function of the corresponding sample bits affected by the external magnetic fields;

comparing the new ideal value and an original ideal value calculated when the data was previously recorded on the media; and determining whether the difference between the new ideal value and the original ideal value exceeds a threshold value.

35. The method of claim 33, further comprising the step of:
(f) if the degradation is detected, then reading the data affected by the external magnetic fields using the branch metric based on the adapted ideal value, re-writing the data and then using the original ideal value for reading the data while the data is not affected by the external magnetic fields.

36. The method of claim 33, wherein:
in step (a) the ideal value $d_j$ is based on the mean of the corresponding sample bits; and
in step (d) the scaling factor $c_j$ is proportional to the noise variance for the corresponding sample bits.

37. In a data channel for a data storage device having a magnetic data storage media and a transducer for recording/playback of data on the media, the channel including a detector having multiple states arranged for maximum likelihood decoding of a series of sample bits with pattern dependent noise and nonlinearities to form a series of detected bits, a method of determining branch metrics for branches of a trellis corresponding to the multiple states in the detector, wherein each branch j connects two of the states, the method comprising the steps of:
(a) determining an ideal value $d_j$ as a function of the corresponding sample bits for each branch j;
(b) increasing the ideal value $d_j$ using a degradation factor for sequence amplitude margining;
(c) determining a difference between the increased ideal value $d_j$ and a sample value y represented by the corresponding sample bits;
(d) determining a branch metric scaling factor $c_j$ as a function of the noise variance for the corresponding sample bits; and
(e) generating the branch metric BM as a function of the difference and the scaling factor $c_j$.

38. A detector circuit for detecting data from signal samples in a data channel, wherein the data is read from a recording media, the detector circuit comprising:
a detector having multiple states arranged for maximum likelihood decoding of a series of sample bits with pattern dependent noise and nonlinearities to form a series of detected bits;
a metric generator that determines branch metrics for branches of a trellis corresponding to the multiple states in the detector, wherein each branch j connects two of the states, and for each branch j the metric generator determines an ideal value $d_j$ as a function of the corresponding sample bits, determines a difference between the ideal value $d_j$ and a sample value y represented by the corresponding sample bits, determines a branch metric scaling factor $c_j$ as a function of the noise variance for the corresponding sample bits, and generates the branch metric BM as a function of the difference and the scaling factor $c_j$; and
an optimizer that performs read-to-read adaptation of the ideal values $d_j$'s by accumulating statistics for the ideal values $d_j$'s while reading from a disk zone having multiple sectors, and for each ideal value $d_j$, obtaining a new ideal value $d_j^{new}$ as a function of the existing ideal value $d_j^{old}$ and an estimated ideal value $d_j^{est}$ wherein the estimated ideal value $d_j^{est}$ is the estimated value of the existing ideal value $d_j^{old}$ obtained while reading from the zone.

39. The detector circuit of claim 38, wherein the optimizer determines each new ideal value $d_j^{new}$ essentially according to the relation:

$$d_j^{new}=(1-\alpha)d_j^{old}+\alpha d_j^{est}$$

wherein $\alpha$, $0 \leq \alpha \leq 1$, is a weighting factor proportional to the number of sectors read from the zone.

40. The detector circuit of claim 38, wherein the metric generator determines each ideal value $d_j$ based on the mean of the corresponding sample bits, and determines the scaling factor $c_j$ as proportional to the noise variance for the corresponding sample bits.

41. The detector circuit of claim 38, wherein the branch metric for each branch j is represented by the relation:

$$BM=\lfloor (y-d_j)^2/c_j \rfloor_b$$

wherein:
y represents the corresponding sample bits,
$d_j$ represents the ideal value,
$c_j$ represents the scaling factor, and
b is the saturation level.

42. The detector circuit of claim 41, wherein the metric generator determines the $d_j$ and $c_j$ values by:
writing a data pattern in a track per zone; and
for each zone, reading the written data, and calculating the $d_j$ and $c_j$ values according to the relations:

$$d_j = \frac{1}{N_j}\sum_{i=1}^{N_j} y_{j,i},$$

$$\sigma_j^2 = -d_j^2 + \frac{1}{N_j-1}\sum_{i=1}^{N_j} y_{j,i}^2,$$

$$\sigma^2 = \frac{1}{m}\sum_{j=1}^{m} \sigma_j^2,$$

$$c_j = c\frac{\sigma_j^2}{\sigma^2}$$

wherein:
$y_{j,i}$ is the ith corresponding sample bit for the jth branch,
$N_j$ is the number of the corresponding sample bits for the jth branch,
$\sigma_j^2$ is the variance of the corresponding sample bits for the jth branch,
c is an average branch metric scaling factor, and
m is the number of the trellis branches.

43. The detector circuit of claim 40, wherein the branch metric for each branch j is determined by the relations:

$$w=2\log_a(y-d_j)-\log_a(c_j),$$

$$BM=a^w$$

wherein a is the logarithm base.

44. The detector circuit of claim 43, wherein the $d_j$ and $c_j$ values are determined by:
writing a data pattern in a track per zone; and for each zone, reading the written data, and calculating the $d_j$ and $c_j$ values according to the relations:

$$d_j = \frac{1}{N_j} \sum_{i=1}^{N_j} y_{j,i},$$

$$\sigma_j^2 = -d_j^2 + \frac{1}{N_j - 1} \sum_{i=1}^{N_j} y_{j,i}^2,$$

$$\sigma^2 = \frac{1}{m} \sum_{j=1}^{m} \sigma_j^2,$$

$$c_j = c \frac{\sigma_j^2}{\sigma^2}$$

wherein:
$y_{j,i}$ is the ith corresponding sample bit for the jth branch,
$N_j$ is the number of the corresponding sample bits for the jth branch,
$\sigma_j^2$ is the variance of the corresponding sample bits for the jth branch,
c is an average branch metric scaling factor, and
m is the number of the trellis branches.

45. The detector circuit of claim 38, wherein the optimizer further accumulates statistics for the scaling factors $c_j$'s while reading from the zone, and for each $c_j$, obtains a new scaling factor $c_j^{new}$ as a function of the existing scaling factor $c_j^{old}$ and an estimated scaling factor $c_j^{est}$ wherein the estimated scaling factor $c_j^{est}$ is the estimated value of the existing scaling factor $c_j^{old}$ obtained while reading from the zone.

46. A detector circuit for detecting data from signal samples in a data channel, wherein the data is read from a recording media, the detector circuit comprising:
a detector having multiple states arranged for maximum likelihood decoding of a series of sample bits with pattern dependent noise and nonlinearities to form a series of detected bits; and
a metric generator that determines branch metrics for branches of a trellis corresponding to the multiple states in the detector, wherein each branch j connects two of the states, and for each branch j the metric generator determines an ideal value $d_j$ as a function of the corresponding sample bits, determines a difference between the ideal value $d_j$ and a sample value y represented by the corresponding sample bits, determines a branch metric scaling factor $c_j$ as a function of the noise variance for the corresponding sample bits, and generates the branch metric BM as a function of the difference and the scaling factor $c_j$;
wherein the branch metric for each branch j is represented by the relations:

$$w = 2 \log_a(y - d_j) - \log_a(c_j),$$

$$BM = a^w$$

wherein a is the logarithm base.

47. The detector circuit of claim 46, wherein the metric generator determines the ideal value $d_j$ based on the mean of the corresponding sample bits, and determines the scaling factor $c_j$ as proportional to the noise variance for the corresponding sample bits.

48. The detector circuit of claim 47, wherein the metric generator determines the $d_j$ and $c_j$ values by:
writing a data pattern in a track per zone; and
for each zone, reading the written data, and calculating $d_j$ and $c_j$ according to the relations:

$$d_j = \frac{1}{N_j} \sum_{i=1}^{N_j} y_{j,i},$$

$$\sigma_j^2 = -d_j^2 + \frac{1}{N_j - 1} \sum_{i=1}^{N_j} y_{j,i}^2,$$

$$\sigma^2 = \frac{1}{m} \sum_{j=1}^{m} \sigma_j^2,$$

$$c_j = c \frac{\sigma_j^2}{\sigma^2}$$

wherein:
$y_{j,i}$ is the ith corresponding sample bit for the jth branch,
$N_j$ is the number of the corresponding sample bits for the jth branch,
$\sigma_j^2$ is the variance of the corresponding sample bits for the jth branch,
c is an average branch metric scaling factor, and
m is the number of the trellis branches.

49. The detector circuit of claim 46, further comprising an optimizer that performs read-to-read adaptation of the ideal values $d_j$'s by accumulating statistics for the ideal values $d_j$'s while reading from a disk zone having multiple sectors, and for each ideal value $d_j$ with a sufficient number of samples, updates stored $d_j$ values based on the relation:

$$d_j^{new} = (1-\alpha) d_j^{old} + \alpha d_j^{est}$$

wherein $d_j^{est}$ is the estimated value of $d_j$ obtained while reading from the zone, and $\alpha$, $0 \leq \alpha \leq 1$, is a weighting factor proportional to the number of sectors read from the zone.

50. The detector circuit of claim 46, further comprising an optimizer that performs read-to-read adaptation of the ideal values $d_j$'s by adapting each $d_j$ value using a least mean square (LMS) algorithm according to the relation:

$$d_j^{k+1} = d_j^k + \mu e_k$$

wherein $e_k = y_{j,k} - d_j^k$ is the error signal at time k, and $\mu$ is the LMS step size.

51. A detector circuit for detecting data from signal samples in a data channel, wherein the data is read from a recording media, the detector circuit comprising:
a detector having multiple states arranged for maximum likelihood decoding of a series of sample bits with pattern dependent noise and nonlinearities to form a series of detected bits; and
a metric generator that determines branch metrics for branches of a trellis corresponding to the multiple states in the detector, wherein each branch j connects two of the states, and for each branch j the metric generator determines an ideal value $d_j$ as a function of the corresponding sample bits, determines a difference between the ideal value $d_j$ and a sample value y represented by the corresponding sample bits, determines a branch metric scaling factor $c_j$ as a function of the noise variance for the corresponding sample bits and a baseline shift in a read signal due to a thermal asperity, and generates the branch metric as a function of the difference and the scaling factor cj, wherein the metric generator further detects if there is the baseline shift in the read signal due to a thermal asperity, and if so, selects the scaling factor $c_j$ for reducing the effect of the baseline shift while maintaining quantization noise within acceptable levels.

52. The detector circuit of claim 51, wherein the baseline shift causes the branch metric to saturate.

53. The detector circuit of claim 51, wherein the metric generator selects the scaling factor $c_j$ as a constant for reducing the effect of the baseline shift.

54. The detector circuit of claim 51, wherein the metric generator selects the scaling factor $c_j$ as a constant of about 10 to 12 for reducing the effect of the baseline shift.

55. The detector circuit of claim 51, further comprising an optimizer that performs read-to-read adaptation of the ideal values $d_j$'s by accumulating statistics for the ideal values $d_j$'s.

56. A detector circuit for detecting data from signal samples in a data channel, wherein the data is read from a recording media, the detector circuit comprising:
a detector having multiple states arranged for maximum likelihood decoding of a series of sample bits with pattern dependent noise and nonlinearities to form a series of detected bits; and
a metric generator that determines branch metrics for branches of a trellis corresponding to the multiple states in the detector, wherein each branch j connects two of the states, and for each branch j the metric generator determines an ideal value $d_j$ as a function of the corresponding sample bits, determines a difference between the ideal value $d_j$ and a sample value y represented by the corresponding sample bits, determines a branch metric scaling factor $c_j$ as a function of the noise variance for the corresponding sample bits and a baseline shift in a read signal due to a thermal asperity, and generates the branch metric as a function of the difference and the scaling factor cj, wherein the metric generator determines the ideal value $d_j$ based on the mean of the corresponding sample bits and determines the scaling factor $c_j$ as proportional to the noise variance for the corresponding sample bits.

57. The detector circuit of claim 56, wherein the metric generator determines the $d_j$ and $c_j$ values by:
writing a data pattern in a track per zone; and
for each zone, reading the written data, and calculating the $d_j$ and $c_j$ values according to the relations:

$$d_j = \frac{1}{N_j} \sum_{i=1}^{N_j} y_{j,i},$$

$$\sigma_j^2 = -d_j^2 + \frac{1}{N_j - 1} \sum_{i=1}^{N_j} y_{j,i}^2,$$

$$\sigma^2 = \frac{1}{m} \sum_{j=1}^{m} \sigma_j^2,$$

$$c_j = c \frac{\sigma_j^2}{\sigma^2}$$

wherein:
$y_{j,i}$ is the ith corresponding sample bit for the jth branch,
$N_j$ is the number of the corresponding sample bits for the jth branch,
$\sigma_j^2$ is the variance of the corresponding sample bits for the jth branch,
c is an average branch metric scaling factor, and
m is the number of the trellis branches.

58. A detector circuit for detecting data from signal samples in a data channel, wherein the data is read from a recording media, the detector circuit comprising:
a detector having multiple states arranged for maximum likelihood decoding of a series of sample bits with pattern dependent noise and nonlinearities to form a series of detected bits; and
a metric generator that determines branch metrics for branches of a trellis corresponding to the multiple states in the detector, wherein each branch j connects two of the states, and the metric generator determines an ideal value $d_j$ as a function of the corresponding sample bits, detects if there is degradation in the recorded data due to thermal decay, and if so, adapts the ideal values as a function of the thermal decay, determines a difference between the ideal value $d_j$ and a sample value y represented by the corresponding sample bits, determines a branch metric scaling factor $c_j$ as a function of the noise variance for the corresponding sample bits, and generates the branch metric BM as a function of the difference and the scaling factor $c_j$.

59. The detector circuit of claim 58, wherein the metric generator adapts the ideal values $d_j$'s as a function of the corresponding sample bits affected by the thermal decay.

60. The detector circuit of claim 59, wherein the metric generator detects the degradation by determining new ideal values as a function of the corresponding sample bits affected by the thermal decay, comparing the new ideal values and original ideal values calculated when the data was previously recorded, and determining whether the difference between the new ideal values and the original ideal values exceeds a threshold value.

61. The detector circuit of claim 59, wherein the metric generator in response to detecting the degradation further reads the data affected by the thermal decay using branch metric values based on the adapted ideal values, re-writes the data, and then uses the original ideal values for reading the data while the data is not affected by the thermal decay.

62. The detector circuit of claim 59, wherein the metric generator determines the ideal values based on the mean of the corresponding sample bits, and determines the scaling factors as proportional to the noise variance for the corresponding sample bits.

63. The detector circuit of claim 58, wherein the metric generator adjusts the ideal values based on prior knowledge of thermal decay to compensate for the thermal decay.

64. The detector circuit of claim 63, wherein the metric generator in response to detecting the degradation further reads the data affected by the thermal decay using branch metric values based on the adapted ideal values, re-writes the data, and then uses the original ideal values for reading the data while the data is not affected by the thermal decay.

65. A detector circuit for detecting data from signal samples in a data channel, wherein the data is read from a recording media, the detector circuit comprising:
a detector having multiple states arranged for maximum likelihood decoding of a series of sample bits with pattern dependent noise and nonlinearities to form a series of detected bits; and
a metric generator that determines branch metrics for branches of a trellis corresponding to the multiple states in the detector, wherein each branch j connects two of the states, and the metric generator determines an ideal value $d_j$ as a function of the corresponding sample bits for each branch j, detects if there is degradation in the recorded data due to external magnetic fields, and if so, adapts the ideal values as a function of the corresponding sample bits affected by the external magnetic fields, determines a difference between the ideal value $d_j$ and a sample value y represented by the corresponding sample bits, determines a branch metric scaling factor $c_j$ as a function of the noise variance for the corresponding sample bits, and generates the branch metric BM as a function of the difference and the scaling factor $c_j$.

66. The detector circuit of claim 65, wherein the metric generator detects the degradation by determining new ideal values as a function of the corresponding sample bits affected by the external magnetic fields, for each branch j, comparing the new ideal values and original ideal values calculated when the data was previously recorded, and determining whether the difference between the new ideal values and the original ideal values exceeds a threshold value.

67. The detector circuit of claim 65, wherein the metric generator in response to detecting the degradation further reads the data affected by the external magnetic fields using branch metric values based on the adapted ideal values, re-writes the data, and then uses the original ideal values for reading the data while the data is not affected by the external magnetic fields.

68. The detector circuit of claim 65, wherein the metric generator determines the ideal values based on the mean of the corresponding sample bits, and determines the scaling factors as proportional to the noise variance for the corresponding sample bits.

69. A detector circuit for detecting data from signal samples in a data channel, wherein the data is read from a recording media, the detector circuit comprising:
- a detector having multiple states arranged for maximum likelihood decoding of a series of sample bits with pattern dependent noise and nonlinearities to form a series of detected bits; and
- a metric generator that determines branch metrics for branches of a trellis corresponding to the multiple states in the detector, wherein each branch j connects two of the states, and the metric generator determines an ideal value $d_j$ as a function of the corresponding sample bits for each branch j, increases the ideal value $d_j$ using a degradation factor for sequence amplitude margining, determines a difference between the ideal value $d_j$ and a sample value y represented by the corresponding sample bits, determines a branch metric scaling factor $c_j$ as a function of the noise variance for the corresponding sample bits, and generates the branch metric BM as a function of the difference and the scaling factor $c_j$.

70. A data storage device comprising:
- a magnetic data storage media;
- a transducer for recording/playback of data on the media;
- a data path including a channel having a detector with multiple states arranged for maximum likelihood decoding of a series of sample bits with pattern dependent noise and nonlinearities to form a series of detected bits;
- a metric generator that determines branch metrics for branches of a trellis corresponding to the multiple states in the detector, wherein each branch j connects two of the states, and for each branch j the metric generator determines an ideal value $d_j$ as a function of the corresponding sample bits, determines a difference between the ideal value $d_j$ and a sample value y represented by the corresponding sample bits, determines a branch metric scaling factor $c_j$ as a function of the noise variance for the corresponding sample bits, and generates the branch metric BM as a function of the difference and the scaling factor $c_j$; and
- an optimizer that performs read-to-read adaptation of the ideal values $d_j$'s by accumulating statistics for the ideal values $d_j$'s while reading from a disk zone having multiple sectors, and for each ideal value $d_j$, obtaining a new ideal value $d_j^{new}$ as a function of the existing ideal value $d_j^{old}$ and an estimated ideal value $d_j^{est}$ wherein the estimated ideal value $d_j^{est}$ is the estimated value of the existing ideal value $d_j^{old}$ obtained while reading from the zone.

71. The data storage device of claim 70, wherein:
the optimizer determines each new ideal value $d_j^{new}$ essentially according to the relation:

$$d_j^{new} = (1-\alpha)d_j^{old} + \alpha d_j^{est}$$

wherein $\alpha$, $0 \leq \alpha \leq 1$, is a weighting factor proportional to the number of sectors read from the zone.

72. The data storage device of claim 70, wherein the metric generator determines each ideal value $d_j$ based on the mean of the corresponding sample bits, and determines the scaling factor $c_j$ as proportional to the noise variance for the corresponding sample bits.

73. The data storage device of claim 70, wherein the branch metric for each branch j is represented by the relation:

$$BM = \lfloor (y-d_j)^2/c_j \rfloor_b$$

wherein:
y represents the corresponding sample bits,
$d_j$ represents the ideal value,
$c_j$ represents the scaling factor, and
b is the saturation level.

74. The data storage device of claim 73, wherein the metric generator determines the $d_j$ and $c_j$ values by:
writing a data pattern in a track per zone; and
for each zone, reading the written data, and calculating the $d_j$ and $c_j$ values according to the relations:

$$d_j = \frac{1}{N_j}\sum_{i=1}^{N_j} y_{j,i},$$

$$\sigma_j^2 = -d_j^2 + \frac{1}{N_j-1}\sum_{i=1}^{N_j} y_{j,i}^2,$$

$$\sigma^2 = \frac{1}{m}\sum_{j=1}^{m} \sigma_j^2,$$

$$c_j = c\frac{\sigma_j^2}{\sigma^2}$$

wherein:
$y_{j,i}$ is the ith corresponding sample bit for the jth branch,
$N_j$ is the number of the corresponding sample bits for the jth branch,
$\sigma_j^2$ is the variance of the corresponding sample bits for the jth branch, c is an average branch metric scaling factor, and m is the number of the trellis branches.

75. The data storage device of claim 72, wherein the branch metric for each branch j is determined by the relations:

$$w=2\log_a(y-d_j)-\log_a(c_j),$$

$$BM=a^w$$

wherein a is the logarithm base.

76. The data storage device of claim 75, wherein the $d_j$ and $c_j$ values are determined by:

writing a data pattern in a track per zone; and for each zone, reading the written data, and calculating the $d_j$ and $c_j$ values according to the relations:

$$d_j = \frac{1}{N_j}\sum_{i=1}^{N_j} y_{j,i},$$

$$\sigma_j^2 = -d_j^2 + \frac{1}{N_j-1}\sum_{i=1}^{N_j} y_{j,i}^2,$$

$$\sigma^2 = \frac{1}{m}\sum_{j=1}^{m} \sigma_j^2,$$

$$c_j = c\frac{\sigma_j^2}{\sigma^2}$$

wherein:

$y_{j,i}$ is the ith corresponding sample bit for the jth branch, $N_j$ is the number of the corresponding sample bits for the jth branch, $\sigma_j^2$ is the variance of the corresponding sample bits for the jth branch, c is an average branch metric scaling factor, and m is the number of the trellis branches.

77. The data storage device of claim 70, wherein the optimizer further accumulates statistics for the scaling factors $c_j$'s while reading from the zone, and for each $c_j$, obtains a new scaling factor $c_j^{new}$ as a function of the existing scaling factor $c_j^{old}$ and an estimated scaling factor $c_j^{est}$ wherein the estimated scaling factor $c_j^{est}$ is the estimated value of the existing scaling factor $c_j^{old}$ obtained while reading from the zone.

78. A data storage device comprising:

a magnetic data storage media;

a transducer for recording/playback of data on the media;

a data path including a channel having a detector with multiple states arranged for maximum likelihood decoding of a series of sample bits with pattern dependent noise and nonlinearities to form a series of detected bits; and a metric generator that determines branch metrics for branches of a trellis corresponding to the multiple states in the detector, wherein each branch j connects two of the states, and for each branch j the metric generator determines an ideal value $d_j$ as a function of the corresponding sample bits, determines a difference between the ideal value $d_j$ and a sample value y represented by the corresponding sample bits, determines a branch metric scaling factor $c_j$ as a function of the noise variance for the corresponding sample bits, and generates the branch metric BM as a function of the difference and the scaling factor $c_j$;

wherein the branch metric for each branch j is represented by the relations:

$$w=2\log_a(y-d_j)-\log_a(c_j),$$

$$BM=a^w$$

wherein a is the logarithm base.

79. The data storage device of claim 78, wherein the metric generator determines the ideal value $d_j$ based on the mean of the corresponding sample bits, and determines the scaling factor $c_j$ as proportional to the noise variance for the corresponding sample bits.

80. The data storage device of claim 79, wherein the metric generator determines the $d_j$ and $c_j$ values by:

writing a data pattern in a track per zone; and for each zone, reading the written data, and calculating $d_j$ and $c_j$ according to the relations:

$$d_j = \frac{1}{N_j}\sum_{i=1}^{N_j} y_{j,i},$$

$$\sigma_j^2 = -d_j^2 + \frac{1}{N_j-1}\sum_{i=1}^{N_j} y_{j,i}^2$$

$$\sigma^2 = \frac{1}{m}\sum_{j=1}^{m} \sigma_j^2,$$

$$c_j = c\frac{\sigma_j^2}{\sigma^2}$$

wherein:

$y_{j,i}$ is the ith corresponding sample bit for the jth branch, $N_j$ is the number of the corresponding sample bits for the jth branch, $\sigma_j^2$ is the variance of the corresponding sample bits for the jth branch, c is an average branch metric scaling factor, and m is the number of the trellis branches.

81. The data storage device of claim 78, further comprising an optimizer that performs read-to-read adaptation of the ideal values $d_j$'s by accumulating statistics for the ideal values $d_j$'s while reading from a disk zone having multiple sectors, and for each ideal value $d_j$ with a sufficient number of samples, updates stored $d_j$ values based on the relation:

$$d_j^{new}=(1-\alpha)d_j^{old}+\alpha d_j^{est}$$

wherein $d_j^{est}$ is the estimated value of $d_j$ obtained while reading from the zone, and $\alpha$, $0\leq\alpha\leq 1$, is a weighting factor proportional to the number of sectors read from the zone.

82. The data storage device of claim 78, further comprising an optimizer that performs read-to-read adaptation of the ideal values $d_j$'s by adapting each $d_j$ value using a least mean square (LMS) algorithm according to the relation:

$$d_j^{k+1}=d_j^k+\mu e_k$$

wherein $e_k=y_{j,k}-d_j^k$ is the error signal at time k, and $\mu$ is the LMS step size.

83. A data storage device comprising:

a magnetic data storage media;

a transducer for recording/playback of data on the media;

a data path including a channel having a detector with multiple states arranged for maximum likelihood decoding of a series of sample bits with pattern dependent noise and nonlinearities to form a series of detected bits; and a metric generator that determines branch metrics for branches of a trellis corresponding to the multiple states in the detector, wherein each branch j connects two of the states, and for each branch j the metric generator determines an ideal value $d_j$ as a function of the corresponding sample bits, determines a difference between the ideal value $d_j$ and a sample value y represented by the corresponding sample bits, determines a branch metric scaling factor $c_j$ as a function of the noise variance for the corresponding sample bits and a baseline shift in a read signal due to a thermal asperity, and generates the branch metric BM as a function of the difference and the scaling factor $c_j$, wherein the metric generator further detects if there is the baseline shift in the read signal due to a thermal asperity, and if so, selects the scaling factor $c_j$ for reducing the effect of the baseline shift while maintaining quantization noise within acceptable levels.

84. The data storage device of claim 83, wherein the baseline shift causes the branch metric to saturate.

85. The data storage device of claim 83, wherein the metric generator selects the scaling factor $c_j$ as a constant for reducing the effect of the baseline shift.

86. The data storage device of claim 83, wherein the metric generator selects the scaling factor $c_j$ as a constant of about 10 to 12 for reducing the effect of the baseline shift.

87. The data storage device of claim 83, further comprising an optimizer that performs read-to-read adaptation of the ideal values $d_j$'s by accumulating statistics for the ideal values $d_j$'s.

88. A data storage device comprising:

a magnetic data storage media;

a transducer for recording/playback of data on the media;

a data path including a channel having a detector with multiple states arranged for maximum likelihood decoding of a series of sample bits with pattern dependent noise and nonlinearities to form a series of detected bits; and a metric generator that determines branch metrics for branches of a trellis corresponding to the multiple states in the detector, wherein each branch j connects two of the states, and for each branch j the metric generator determines an ideal value $d_j$ as a function of the corresponding sample bits, determines a difference between the ideal value $d_j$ and a sample value y represented by the corresponding sample bits, determines a branch metric scaling factor $c_j$ as a function of the noise variance for the corresponding sample bits and a baseline shift in a read signal due to a thermal asperity, and generates the branch metric BM as a function of the difference and the scaling factor $c_j$, wherein the metric generator determines the ideal value $d_j$ based on the mean of the corresponding sample bits and determines the scaling factor $c_j$ as proportional to the noise variance for the corresponding sample bits.

89. The data storage device of claim 88, wherein the metric generator determines the $d_j$ and $c_j$ values by:

writing a data pattern in a track per zone; and for each zone, reading the written data, and calculating the $d_j$ and $c_j$ values according to the relations:

$$d_j = \frac{1}{N_j}\sum_{i=1}^{N_j} y_{j,i},$$

$$\sigma_j^2 = -d_j^2 + \frac{1}{N_j-1}\sum_{i=1}^{N_j} y_{j,i}^2,$$

$$\sigma^2 = \frac{1}{m}\sum_{j=1}^{m} \sigma_j^2,$$

$$c_j = c\frac{\sigma_j^2}{\sigma^2}$$

wherein:

$y_{j,i}$ is the ith corresponding sample bit for the jth branch, $N_j$ is the number of the corresponding sample bits for the jth branch, $\sigma_j^2$ is the variance of the corresponding sample bits for the jth branch, c is an average branch metric scaling factor, and m is the number of the trellis branches.

90. A data storage device comprising:

a magnetic data storage media;

a transducer for recording/playback of data on the media;

a data path including a channel having a detector having multiple states arranged for maximum likelihood decoding of a series of sample bits with pattern dependent noise and nonlinearities to form a series of detected bits; and a metric generator that determines branch metrics for branches of a trellis corresponding to the multiple states in the detector, wherein each branch j connects two of the states, and the metric generator determines an ideal value $d_j$ as a function of the corresponding sample bits, detects if there is degradation in the recorded data due to thermal decay, and if so, adapts the ideal values as a function of the thermal decay, determines a difference between the ideal value $d_j$ and a sample value y represented by the corresponding sample bits, determines a branch metric scaling factor $c_j$ as a function of the noise variance for the corresponding sample bits, and generates the branch metric BM as a function of the difference and the scaling factor $c_j$.

91. The data storage device of claim 90, wherein the metric generator adapts the ideal values $d_j$'s as a function of the corresponding sample bits affected by the thermal decay.

92. The data storage device of claim 91, wherein metric generator detects the degradation by determining new ideal values as a function of the corresponding sample bits affected by the thermal decay, comparing the new ideal values and original ideal values calculated when the data was previously recorded, and determining whether the difference between the new ideal values and the original ideal values exceeds a threshold value.

93. The data storage device of claim 91, wherein the metric generator in response to detecting the degradation further reads the data affected by the thermal decay using branch metric values based on the adapted ideal values, re-writes the data, and then uses the original ideal values for reading the data while the data is not affected by the thermal decay.

94. The data storage device of claim 91, wherein the metric generator determines the ideal values based on the mean of the corresponding sample bits, and determines the scaling factors as proportional to the noise variance for the corresponding sample bits.

95. The data storage device of claim 90, wherein the metric generator adjusts the ideal values based on prior knowledge of thermal decay to compensate for the thermal decay.

96. The data storage device of claim 95, wherein the metric generator in response to detecting the degradation further reads the data affected by the thermal decay using branch metric values based on the adapted ideal values, re-writes the data, and then uses the original ideal values for reading the data while the data is not affected by the thermal decay.

97. A data storage device comprising:
   a magnetic data storage media;
   a transducer for recording/playback of data on the media;
   a data path including a channel having a detector having multiple states arranged for maximum likelihood decoding of a series of sample bits with pattern dependent noise and nonlinearities to form a series of detected bits; and
   a metric generator that determines branch metrics for branches of a trellis corresponding to the multiple states in the detector, wherein each branch j connects two of the states, and the metric generator determines an ideal value $d_j$ as a function of the corresponding sample bits for each branch j, detects if there is degradation in the recorded data due to external magnetic fields, and if so, adapts the ideal values as a function of the corresponding sample bits affected by the external magnetic fields, determines a difference between the ideal value $d_j$ and a sample value y represented by the corresponding sample bits, determines a branch metric scaling factor $c_j$ as a function of the noise variance for the corresponding sample bits, and generates the branch metric BM as a function of the difference and the scaling factor $c_j$.

98. The data storage device of claim 97, wherein the metric generator detects the degradation by determining new ideal values as a function of the corresponding sample bits affected by the external magnetic fields, for each branch j, comparing the new ideal values and original ideal values calculated when the data was previously recorded, and determining whether the difference between the new ideal values and the original ideal values exceeds a threshold value.

99. The data storage device of claim 97, wherein the metric generator in response to detecting the degradation further reads the data affected by the external magnetic fields using branch metric values based on the adapted ideal values, re-writes the data, and then uses the original ideal values for reading the data while the data is not affected by the external magnetic fields.

100. The data storage device of claim 97, wherein the metric generator determines the ideal values based on the mean of the corresponding sample bits, and determines the scaling factors as proportional to the noise variance for the corresponding sample bits.

* * * * *